United States Patent [19]

Shaw et al.

[11] Patent Number: 5,604,843
[45] Date of Patent: Feb. 18, 1997

[54] METHOD AND SYSTEM FOR INTERFACING WITH A COMPUTER OUTPUT DEVICE

[75] Inventors: Lin F. Shaw, Redmond; Eric J. Bidstrup, Carnation; Zhanbing Wu, Kent, all of Wash.

[73] Assignee: Microsoft Corporation, Redmond, Wash.

[21] Appl. No.: 995,287

[22] Filed: Dec. 23, 1992

[51] Int. Cl.$^6$ .................................................. G06K 15/00
[52] U.S. Cl. ........................................ 395/101; 395/114
[58] Field of Search ................................. 395/112, 114, 395/116, 115, 111, 101; 371/11.1

[56] References Cited

U.S. PATENT DOCUMENTS

| | | | |
|---|---|---|---|
| 5,140,675 | 8/1992 | Okada | 395/114 |
| 5,146,547 | 9/1992 | Beck et al. | 395/116 |
| 5,165,014 | 11/1992 | Vassar | 395/112 |
| 5,228,118 | 7/1993 | Sasaki | 395/112 |
| 5,268,993 | 12/1993 | Ikenoue et al. | 395/114 |
| 5,287,434 | 2/1994 | Bain et al. | 395/101 |
| 5,293,466 | 3/1994 | Bringmann | 395/114 |
| 5,337,319 | 8/1994 | Furukawa et al. | 371/11.1 |
| 5,410,641 | 4/1995 | Wakabayashi et al. | 395/112 |

Primary Examiner—Raymond J. Bayerl
Assistant Examiner—Steven P. Sax
Attorney, Agent, or Firm—Seed and Berry LLP

[57] ABSTRACT

A computer method and system for configuring device driver is provided. In a preferred embodiment, a device driver comprises a minidriver associated with each output device and a universal driver. Each minidriver implements a plurality of minidriver functions for controlling the outputting of data to the output device by invoking functions of the universal driver. During execution of a program, the program selects an output device and invokes the minidriver functions of the minidriver associated with the selected output device. An initialization function of each minidriver invokes an initialization function of the universal driver passing an indication of and attributes of the selected output device. Other minidriver functions invoke an analogous function of the universal driver passing an indication of the selected output device. The initialization function of the universal driver processes the passed attributes and stores the indication and the processed attributes. Each analogous function accesses the stored attributes and performs the behavior of the analogous function to effect the controlling of the output device.

13 Claims, 9 Drawing Sheets

DEVICE DATA STRUCTURE

| | |
|---|---|
| type of device | 601 |
| general flags | 602 |
| master unit data | 603 |
| copy data | 604 |
| font data | 605 |
| handle of device context | 606 |
| handle of minidriver data | 607 |
| paper format | 608 |
| band format | 609 |
| bitmap data | 610 |
| printer state data | 611 |
| clipping/bounding rectangle | 612 |
| resolution data | 613 |
| callback functions | 614 |
| index to model data | 615 |
| command array | 616 |
| spooling data and buffers | 617 |
| banding bitmap | 618 |
| download controls | 619 |
| miscellaneous data | 620 |

*Figure 6*

METHOD AND SYSTEM FOR INTERFACING WITH A COMPUTER OUTPUT DEVICE

TECHNICAL FIELD

This invention relates generally to a computer method and system for interfacing with devices and, more specifically, to a method and system for implementing device drivers.

BACKGROUND OF THE INVENTION

Computer systems output data to a variety of output devices, such as, printers, plotters, and video displays. Each device typically has a manufacturer defined device-specific protocol for communicating with the device. A computer system, under the control of an operating system, uses the protocol to communicate with a device. Thus, an operating system must know the protocol for each device to which it communicates. It would be impractical for an operating system developer to provide an interface to every available output device. Moreover, it would be impracticable to provide an interface to output devices that have not yet been developed. To overcome these difficulties, operating systems interface with devices indirectly through device drivers. The operating system developer defines the functionality of the operating system/device driver interface. Each manufacturer of a device then provides a device driver, which implements the operating system/device driver interface that is consistent with the device protocol. The operating system loads the device driver and invokes its functions to communicate with the device.

A primary goal of operating systems is to provide an application program environment which is output device independent. This independence means that an application program can output its data to various types of devices without modification of the program. For example, an operating system can redirect output of application program data to a display, printer, or file without the application program being aware of the redirection.

FIG. 1 is a block diagram illustrating a prior device driver configuration. Computer system 100 comprises application program 101, graphics device interface 102, and device drivers 103. Each device driver interfaces with a device 105 that is attached to computer system 100. Application program 101 outputs data using functions provided by the graphics device interface (GDI) 102, which is typically part of an operating system. The GDI effects the output of data by invoking functions implemented by the device drivers 103 in accordance with the operating system/device driver interface. The graphics device interface and device drivers insulate the application program from the different characteristics of the devices. The GDI provides a variety of functions for accessing the devices in a device-independent manner.

The developer of a graphics device interface provides a definition of its functionality to the developers of application programs. An example of such a graphics device interface is described in *Programming Windows* 3.1 by Charles Petzold, published by Microsoft Press. The developer of the graphics device interface also specifies the behavior of each function that a device driver (the operating system/device driver interface) must implement. For example, one graphics device interface specifies six categories of functions that must be implemented by a device driver: (1) initialization, (2) information, (3) output, (4) attribute, (5) mode, and (6) escape. In the following, reference is specifically made to outputting data to a printer. One skilled in the art would appreciate that such references also apply to other output devices. Each of the functions that must be implemented by a device driver is described.

| Function | Description |
| --- | --- |
| (1) Initialization | |
| Control | performs device-dependent operations such as starting an output job, aborting an output job, and processing a new band of bitmap data. |
| Disable | deallocates memory used by the device drivers data structures and unloads the device driver from memory. |
| Enable | allocates and initializes memory for a data structure containing device dependent and device state information. |
| WEP | signals the device driver that the operating system is shutting down. |
| (2) Information | |
| ColorInfo | translates physical colors to logical colors and vice versa. |
| EnumDFonts | enumerates the fonts available on the device. |
| EnumObj | enumerates the pens and brushes that are available on the device. |
| DevGetCharWidth | returns width values for characters in a specified printer font. |
| (3) Output | |
| DevBitBlt | sets pels on the output device. |
| DevExtTextOut | renders text on the output device. |
| Output | renders a shape on the output device. |
| Pixel | sets a single pel on the output device. |
| ScanLR | sets pels in a single row of the output device. |
| StretchBlt | renders scaled bitmaps on the output device. |
| (4) Attributes | |
| RealizeObject | converts a logical pen, brush, font, etc. data structure to a physical pen, brush, font, etc. data structure. |
| (5) Modes | |
| DeviceMode | displays a dialog box that allows a user to select device options such as paper size, paper orientation, and output quality. |
| (6) Escape | |
| QueryEscSupport | specifies whether the output device supports a specified escape sequence. |
| SetAbortDoc | invokes the abort procedure of an application program. |
| StartDoc | signals the beginning of an output job. |
| NextBand | outputs a band of bitmap data. |
| EndDoc | signals the end of an output job. |
| AbortDoc | signals the abnormal termination of an output job. |

An application program outputs data to a particular device by first requesting the graphics device interface to create a device context. The device context identifies the particular device and contains the current state of the device. For example, the device context may contain the current font and paintbrush information. The graphics device interface provides the application program with a handle to a created device context. Whenever the application program outputs data to the particular device, the application program passes the handle to the device context. The graphics device interface functions use the passed handle to access the device context.

When developing a device driver, the developer codes, tests, and debugs each device driver function. This process requires a thorough understanding to the windowing environment, the graphics device interface, the device hardware, and the device communications protocol. This development process is complex, time consuming, and costly.

SUMMARY OF THE INVENTION

It is an object of the present invention to provide a method and system for configuring device drivers.

It is another object of the present invention to provide a method and system for storing data describing device-specific attributes.

These and other objects, which will become apparent as the invention is more fully described below, are provided by a method and system for configuring device driver. In a preferred embodiment, a device driver comprises a minidriver associated with each output device and a universal driver. Each minidriver implements a plurality of minidriver functions for controlling the outputting of data to the output device by invoking functions of the universal driver. During execution of a program, the program selects an output device and invokes the minidriver functions of the minidriver associated with the selected output device. An initialization function of each minidriver invokes an initialization function of the universal driver passing an indication of and attributes of the selected output device. Other minidriver functions invoke an analogous function of the universal driver passing an indication of the selected output device. The initialization function of the universal driver processes the passed attributes and stores the indication and the processed attributes. Each analogous function accesses the stored attributes and performs the behavior of the analogous function to effect the controlling of the output device.

BRIEF DESCRIPTION OF THE DRAWINGS

FIG. 6 is a block diagram illustrating the device data structure.

DETAILED DESCRIPTION OF THE INVENTION

Figure 1:
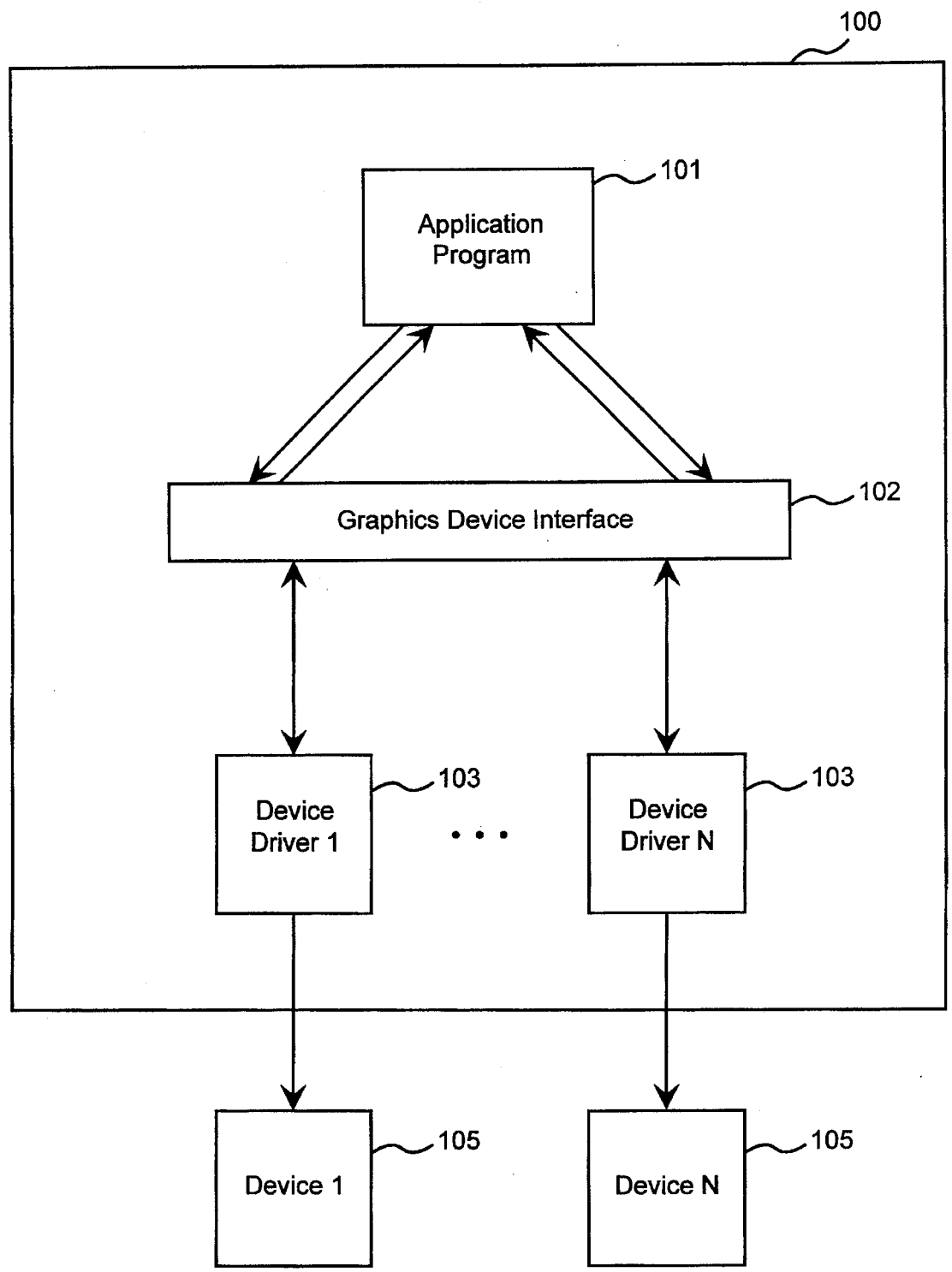
FIG. 1 is a block diagram illustrating a prior device driver configuration.
Figure 2:
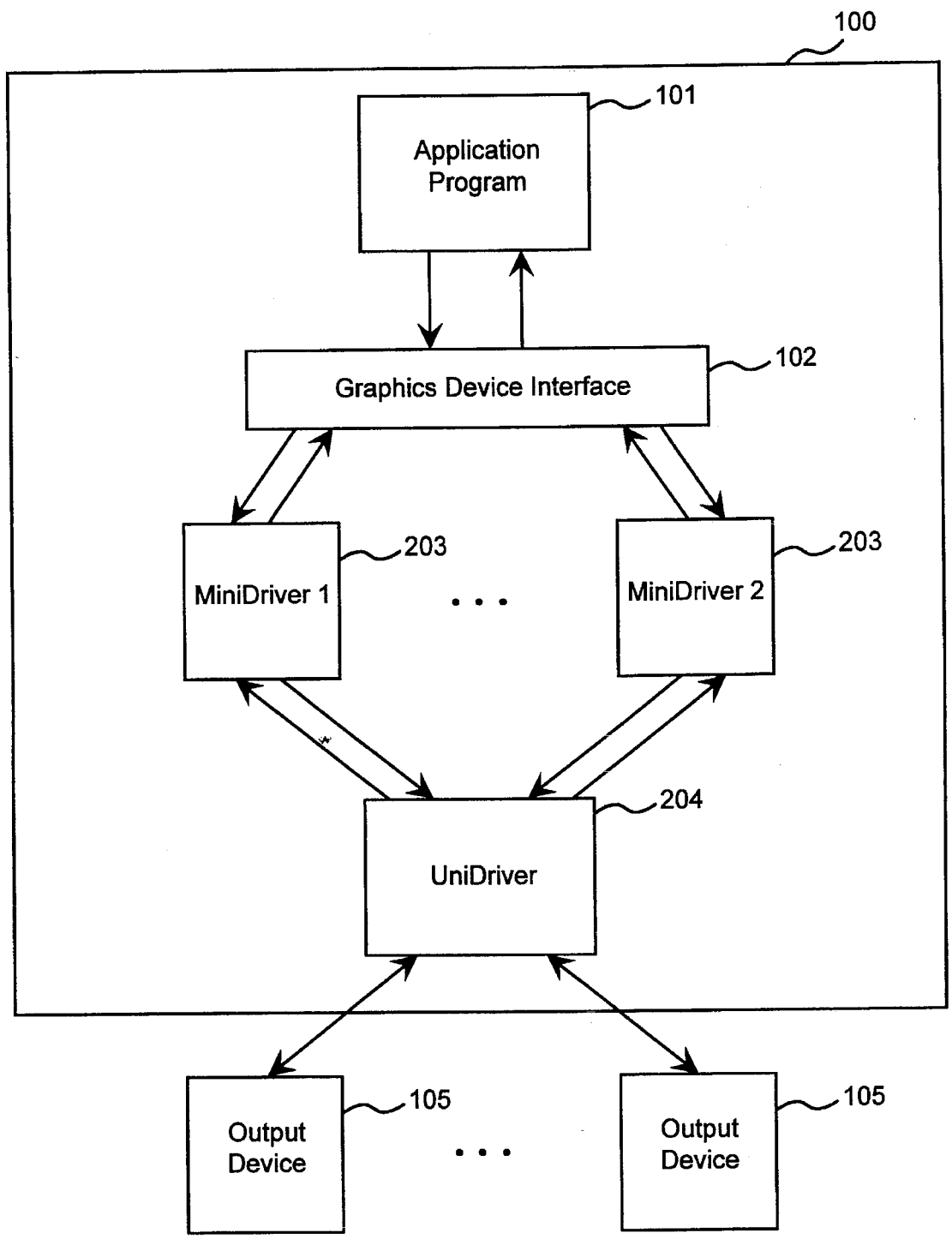
FIG. 2 is a block diagram illustrating a preferred device driver configuration of the present invention.

The present invention provides a method and system for implementing device drivers. FIG. 2 is a block diagram illustrating a preferred device driver configuration of the present invention. Computer system 100 includes a central processing unit, computer memory, and input and output devices. The computer system executes application program 101, graphics device interface 102, minidrivers 203, and universal driver 204. The minidrivers and universal driver combine to preferably provide the same functionality and the prior art device drivers 103. Each device 105 has a corresponding minidriver 203. Each minidriver implements each of the device driver functions and contains data characterizing the corresponding device. In a preferred embodiment, each device driver function of the minidriver implementation (except for an initialization function) forwards its invocation to an analogous device driver function implemented by the universal driver. The universal driver also implements each device driver function. The universal driver functions control the interfacing with the destination device in accordance with the device characterization data, passed parameters, and device state.

The application program 101 initiates the output of data by invoking a GDI function of the graphics device interface 102 and specifying a destination device. The GDI function invokes the device driver functions of the minidriver 203 corresponding to the destination device. In a preferred embodiment, an initialization device driver function of each minidriver passes device characterization data to the universal driver. The universal driver stores this device characterization data (preferably within a device context) to be used by the other device driver functions of the universal driver. The other device driver functions of the minidriver 203 forward their invocation to the universal driver by invoking an analogous function of the universal driver.

MINIDRIVER

Figure 4A:
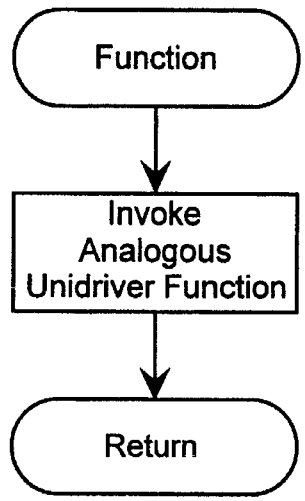
FIG. 4A is a flow diagram illustrating a typical device driver function implemented by a minidriver.
Figure 4B:
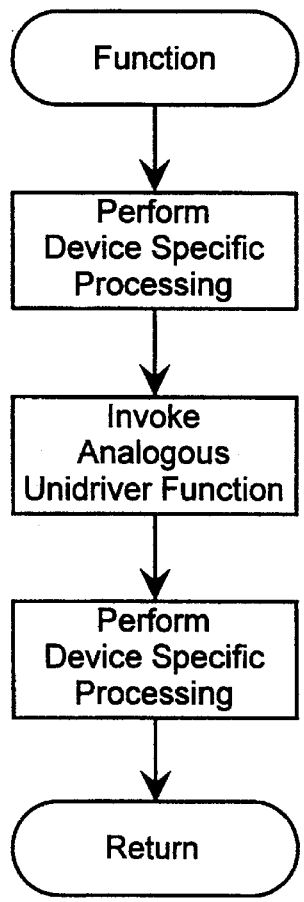
FIG. 4B is a flow diagram illustrating an alternate embodiment of a device driver function implemented by a minidriver.

FIG. 4A is a flow diagram illustrating a typical device driver function implemented by a minidriver. The function forwards the invocation to the analogous universal driver (unidriver) function. The device driver function preferably passes the same parameters it receives to the device driver function of the universal driver. FIG. 4B is a flow diagram illustrating an alternate embodiment of a device driver function implemented by a minidriver. In this alternate embodiment, the device driver function, in addition to forwarding the invocation, performs a device-specific process before and after forwarding the invocation.

Figure 5:
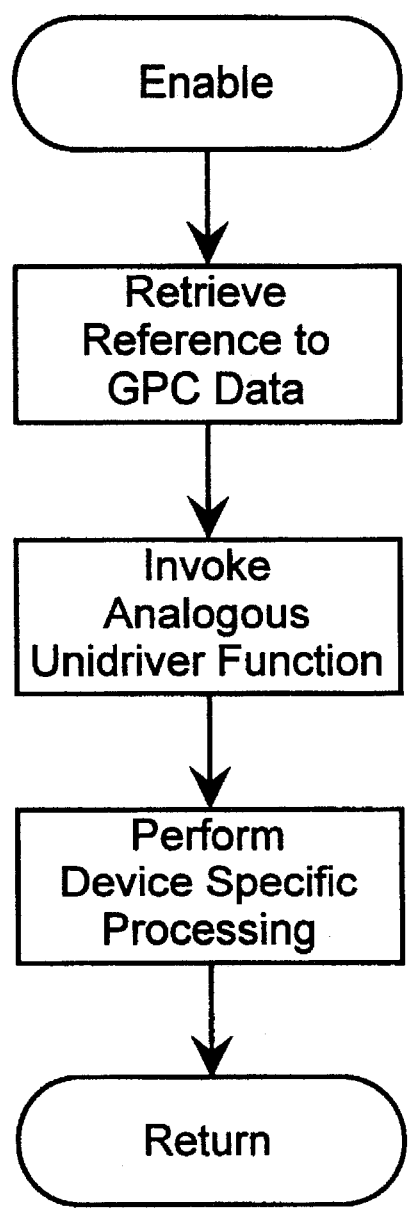
FIG. 5 is a flow diagram of a typical initialization device driver function implemented by the minidriver.

FIG. 5 is a flow diagram of a typical initialization device driver function implemented by the minidriver. This initialization function reads the device characterization data, stores the device characterization data in a format expected by the universal driver, initializes the device context data for the graphics device interface, initializes device state information, and invokes the analogous universal driver function.

In the following, reference is made to printer characterization data as a specific example of device characterization data. One skilled in the art would appreciate that the concepts described are applicable to other types of devices.

PRINTER CHARACTERIZATION DATA OVERVIEW

Printer characterization data includes device data and font data. The device data describes the attributes of a printer, except for the font data. The device data is organized into data structures of related attributes so that similar printer models can share data structures. A printer model can be described as a collection of attributes. The device data contains the printer control commands (e.g., escape sequences). The printer characterization data is described below in detail in the section entitled "Printer Characterization Data Details."

The font data describes the attributes of a font. A font is defined as a pitch, point, symbol set, and typeface combination. Each font data structure describes a single font. The device data contains references to the font data structures corresponding to the fonts supported by the printer.

A device data file contains a description of one or more printers. Each printer is described by a collection of various attribute data structures. The attributes encompass aspects of selecting a paper size and source, rendering text and raster data onto a page, ejecting pages, and selecting an output bin.

The device data file contains a header data structure that describes the size, count, and offsets to each of the other structures in the file. The device data file contains a MODELDATA structure for each printer model described. Each MODELDATA structure describes the capabilities and physical attributes of a printer model. Each MODELDATA structure references other attribute structures in the device data file. All printer commands, escape codes, and other variable length data are stored in a HEAP section of the device data file. Each printer control command is described in a Command Descriptor structure, and the location of each Command Descriptor is referenced from an attribute structure as an offset from the beginning of the HEAP section. The following is a brief description of the types of attribute structures used to characterize various attributes of a printer.

| Structure | Description |
| --- | --- |
| MODELDATA | describes all characteristics of a printer model and contains data describing which of the attribute structures are supported by the printer model. |
| RESOLUTION | corresponds to a single raster graphics resolution of the printer and contains all the information and commands needed to render raster graphics data. |
| PAPERSIZE | describes a single paper size, unprintable regions, and commands required to select it. |
| PAPERQUALITY | describes the types of paper or other media that a device may render an image on. (This is typically used to describe attributes such as plain paper, transparencies, coated paper, etc.) |
| PAPERSOURCE | describes a paper feed method and bin. |
| PAPERDEST | describes a paper output bin and method, and associates a string describing a single bin and method with a printer command. |
| TEXTQUALITY | describes a text quality attribute such as draft, near letter quality, or letter quality, and associates a descriptive string with a printer command. |
| COMPRESSMODE | describes a data compression mode and printer commands. |
| FONTCART | describes a single font cartridge. |
| PAGECONTROL | contains printer commands needed to control the printer on a per print job basis, such as printer commands to initialize the printer and select orientation, and indicates the order that commands should be sent to printer. |
| CURSORMOVE | describes printer commands, methods, and limitations for moving the cursor (current active position) around a page. |
| FONTSIMULATION | describes a collection of printer commands to enable and disable font attributes such as bold, italic, and underline. |
| DEVCOLOR | describes information needed to print color graphics and text. |
| RECTFILL | describes information needed to print filled rectangles. |
| DOWNLOADINFO | describes the commands and methods used to download fonts to the printer. |

Figure 3A:
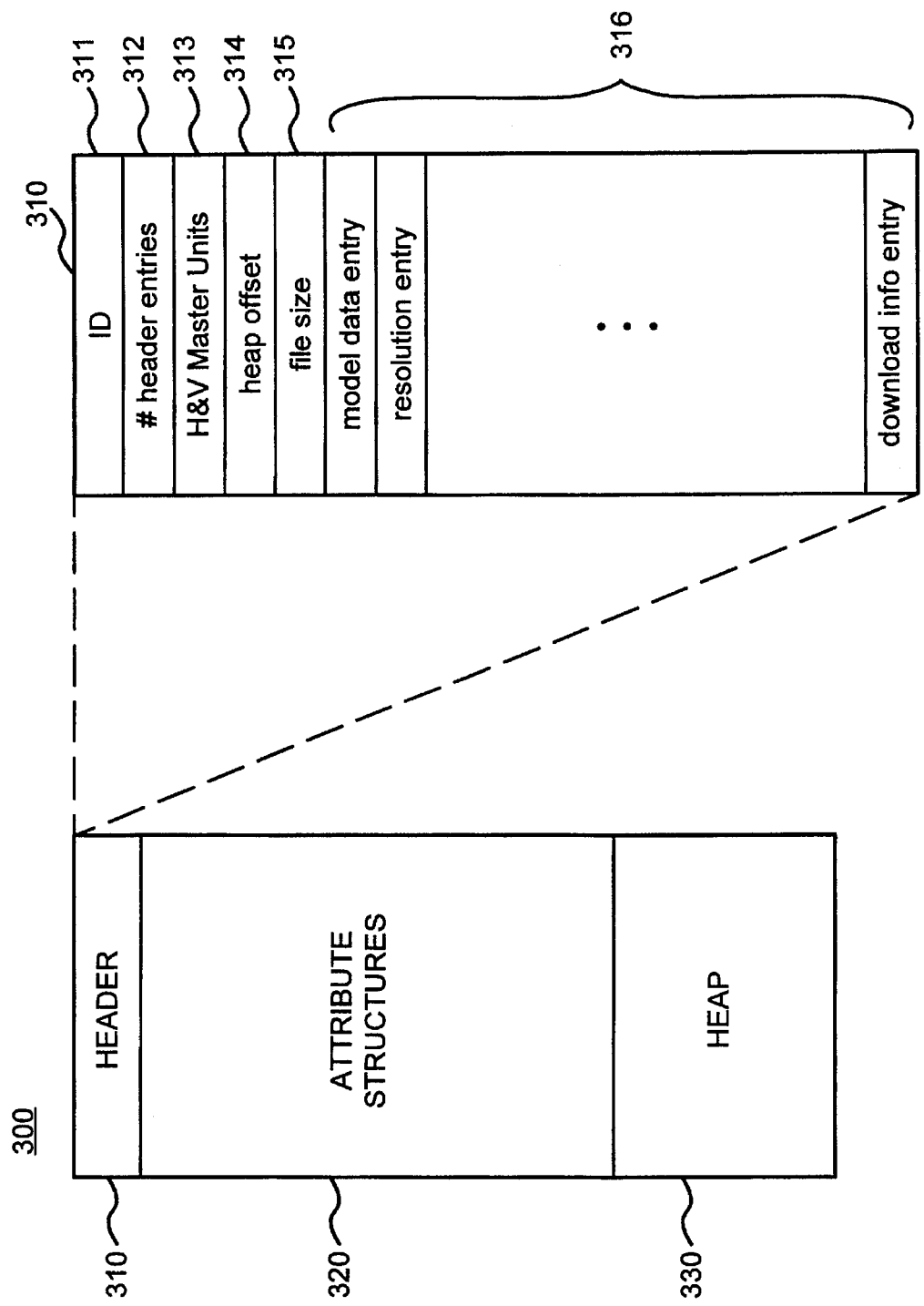
FIGS. 3A, 3B, and 3C are block diagrams illustrating the layout of device data in a preferred embodiment.
Figure 3B:
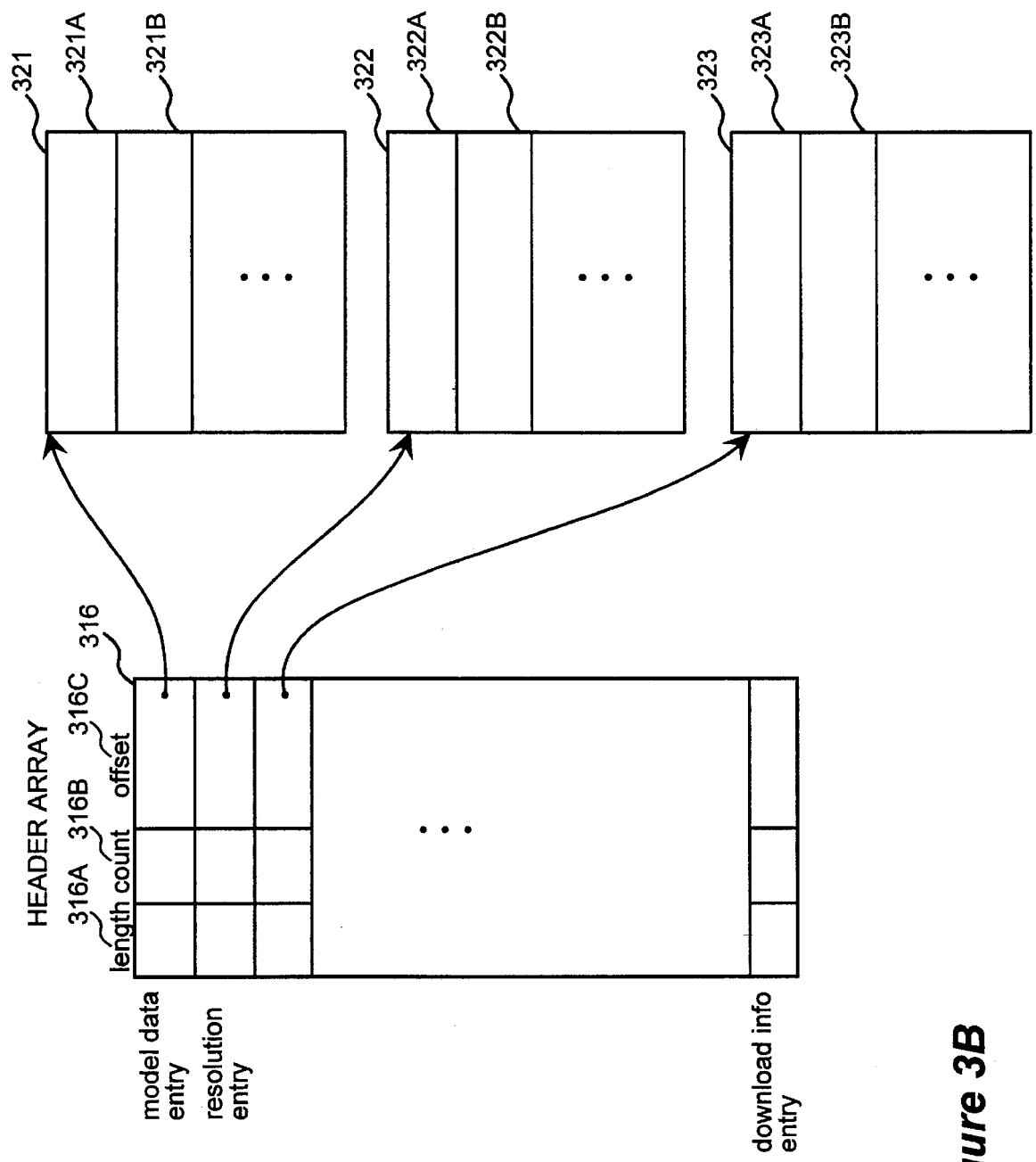
Figure 3C:
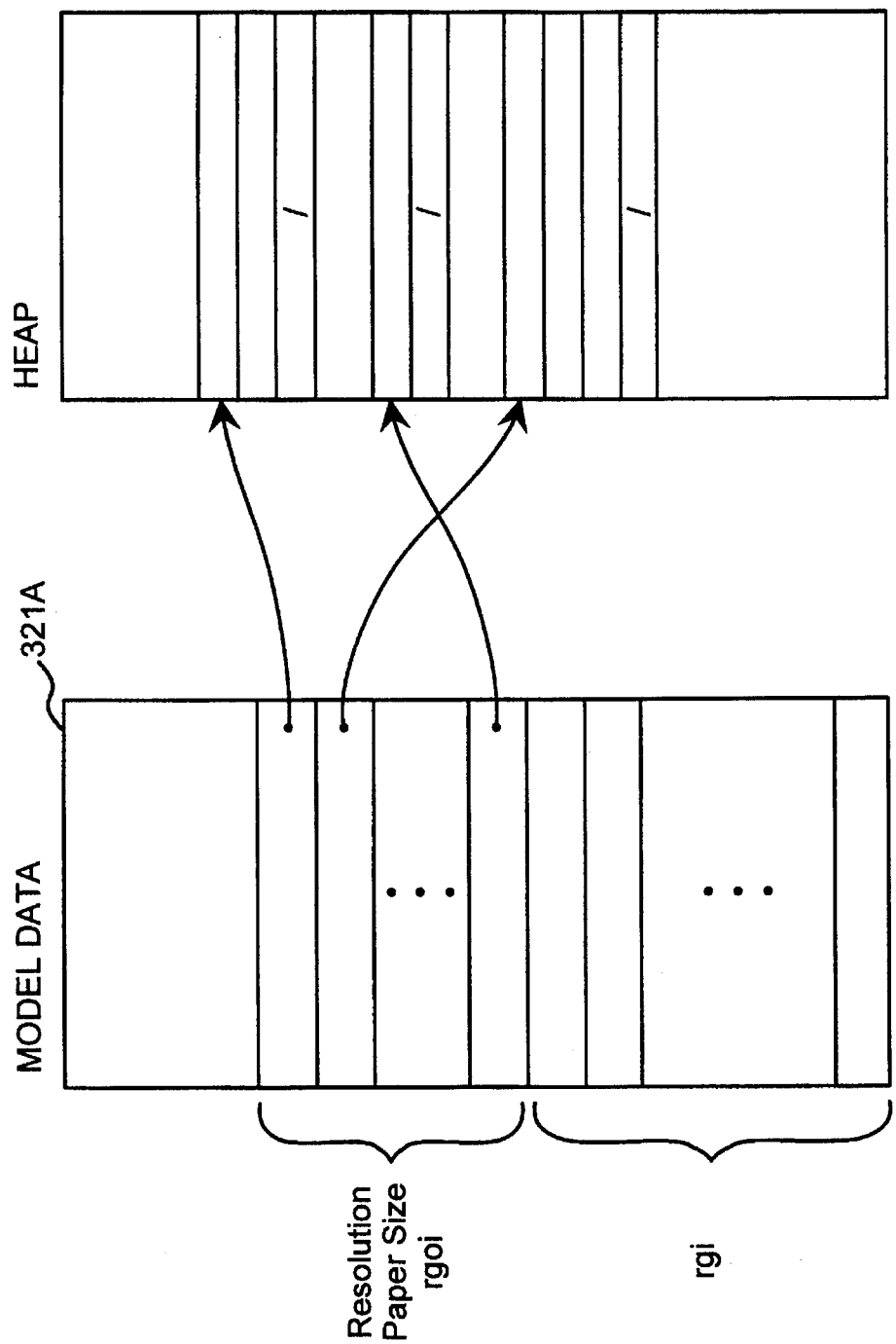

FIGS. 3A, 3B, and 3C are block diagrams illustrating the layout of device data file in a preferred embodiment. The device data file 300 comprises header data 310, attribute structures 320, and heap 330. The header data 310 contains an identification field 311, number of entries field 312, horizontal and vertical master units field 313, heap offset field 314, file size field 315, and header array 316. The identification field 311 contains an indication that the file is a device data file. The number of entries field 312 indicates the number of entries in the header array 316. The horizontal and vertical master units field 313 are described below. The heap offset field 314 contains the offset from the start of the device data file to the heap 330. The file size field 315 contains the size of the device data file 300. The header array 316 contains an entry for each type of attribute structure. Each header array entry contains a length field 316A, a count field 316B, and an offset field 316C. The length field 316A contains the length in bytes of the corresponding type of attribute structure. The count field 316B contains the number of different attribute structures for the corresponding type of attribute. The offset field 316C contains the offset within the device data file 300 of the array of corresponding attribute structures. The attribute arrays 321, 322, and 323 are stored in the attribute structures 320. Each attribute array contains an entry for each different description of an attribute type. Each printer model defined by the device data file has a corresponding entry in the MODELDATA attribute array. The MODELDATA structure 321A contains model specific data including an array of multiple attributes and an array of single attributes that describe the printer model. Each entry in the multiple attribute array is an offset within the heap 330 of a list of indexes for the associated multiple attribute data structures. Each entry in the single attribute array is an index into the corresponding attribute array.

UNIVERSAL DRIVER

The universal driver provides an implementation for each of the device driver functions. The universal driver functions control the interfacing with the destination device in accordance with the printer characterization data, passed parameters, and device state. In a preferred embodiment the Enable function of the universal driver receives a reference to the printer characterization data of a minidriver. The Enable function initializes a device data structure which contains data derived from the printer characterization data stored in a format for efficient access and contains the current state of the printer. The device data structure is stored as part of the device context. Each of the other functions of the universal driver accesses the device data structure when outputting data to the printer.

Figure 7:
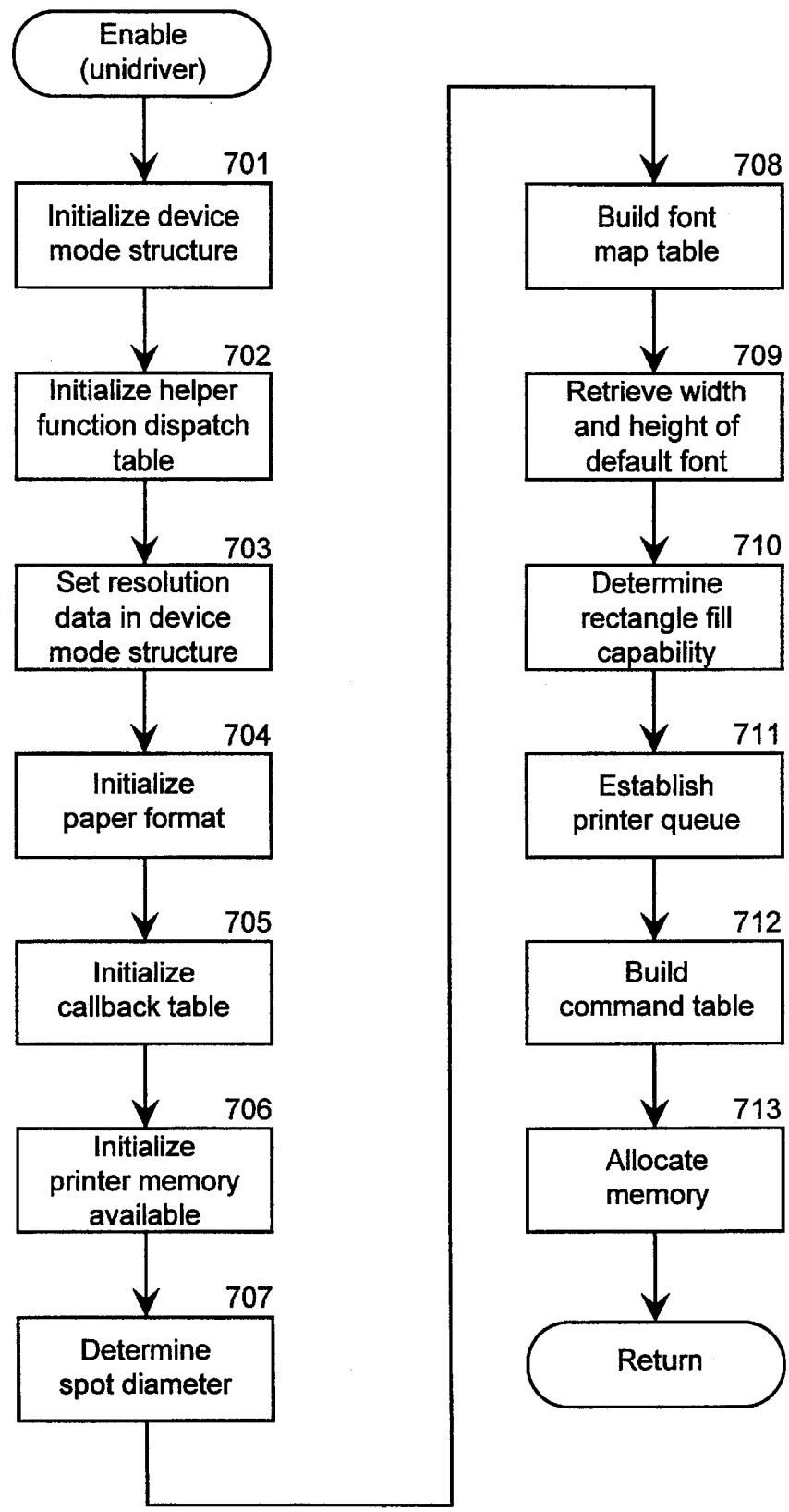
FIG. 7 is a flow diagram of the Enable function of the universal driver.

FIG. 7 is a flow diagram of the Enable function of the universal driver. This function is invoked by each minidriver when an application wishes to create a new printing surface or context. This function initializes the device data structure. In step 701, the function initializes the device mode data based on information provided by the invoking minidriver. If the invoking minidriver does not provide certain information, then the function retrieves default information specific to the printer and initializes the device mode data accordingly. In step 702, the function initializes a helper function dispatch table. The helper function dispatch table contains an array of pointers to functions for drawing into banding bitmaps. A banding bitmap represents a portion of the printing surface. If a bit in the bitmap is set, then the corresponding dot on the printer is printed. Different sets of helper functions may be selected based on the number of colors in the printer. The Enable function initializes the helper function table with the appropriate helper functions. The universal driver uses the function pointers stored in the helper function table to draw to the banding bitmap. In step 703, the function initializes resolution information. For example, the resolution data includes the number of pels per inch. In step 704, the function initializes the paper format information of the device data structure. The information is initialized based on the paper size, model data, resolution, paper source, and device mode data in the printer characterization data. In step 705, the function initializes the call-back table. The universal driver invokes a call-back function of the minidriver to perform minidriver specific processing. In step 706, the function determines the amount of memory available in the printer based on the model data. This information is used to avoid out-of-memory errors when downloading fonts and graphic bitmaps to printers. In step 707, the function determines the spot diameter (a measurement of how closely the printed dots overlap each other) based on the information in the resolution data. The spot diameter is used to adjust the intensity of the output based on the spot size of the ink. In step 708, the function builds a table of all the printer fonts available based on the information in the model data and the printer font metric resource provided by the minidriver. This data is used by the function RealizeObject to convert a logical font request to a physical font. This conversion is called font mapping. The use of a table font obviates a need to access the disk or minidriver to perform font mapping. The function also initializes commands needed to select and deselect each font. In step 709, the function retrieves the width and height of the principal font and stores it in the device data structure. In step 710, the function determines whether the printer supports a rectangle fill capability and initializes the device data structure accordingly. In step 711, the function establishes a priority queue for printers that must be accessed serially, such as dot matrix printers. This queue is used to sort text requests. In step 712, the function initializes a command table. The command table is an array of offsets to command descriptors. These command descriptors specify the commands that are to be sent to the printer to enable a certain feature. For example, a certain command descriptor would specify the codes which cause the printer to enable underlining, and another command descriptor would cause the printer to disable underlining. In step 713, the function allocates memory for font download information. The function then returns.

Each of the other device driver functions that are implemented by the universal driver performs the behavior of the function using the data supplied by the invoking minidriver and stored in the device data structure.

DEVICE DATA STRUCTURE OVERVIEW

FIG. 6 is a block diagram illustrating the device data structure. The device data structure is described below in detail in the section entitled "Device Data Structure Detail." The device data structure contains information necessary to control the output of information to a designated printer. The device data structure includes the following information. Type of device data 601 indicates the type of printer (e.g., laser). General flags 602 contain various flags relating to paper source, rectangle fill, and text capabilities. The master unit data 603 contains the least common multiplier of all resolutions and printer command units. The copy data 604 contains information relating to number of copies of a document requested and number of copies allowed. Font data 606 includes the count of fonts available, default font, and a reference to a font map. The handle of device context data 606 contains a reference to the device context associated with the device data structure. The handle of the minidriver data 607 contains a reference to the generic printer characterization data for this data structure. The paper format data 608 contains information relating to the format of the paper such as physical paper size, printable area, margins, and current paper bin. The band format data 609 contains information relating to the banding process. The banding information includes the height and the width of the band. The bitmap data 610 contains a buffer used by the universal driver to generate a shadow bitmap based on the amount of memory available in the system and the resolution data. The shadow bitmap is downloaded to the printer to effect output. The printer state data 611 contains the current state of the printer, such as, current cursor position, last font selected, and last color selected. The clipping/bounding rectangle data 612 defines the clipping and bounding rectangles. The resolution data 613 defines the resolution of the printer. The call-back functions table 614 contains pointers to each of the call-back functions defined by the minidriver. The index to model data 615 is an index into the model data array of the printer characterization data. The command array 616 contains offsets to the command descriptors within the heap of the printer characterization data. Each entry in the command array specifies the commands needed to enable or disable a particular capability of the printer (e.g., underline, bold, etc.). The spooling data and buffers 617 contain information that allows the universal driver to spool data from various minidrivers for transmission to a single printer. The banding bitmap data 618 contains information describing the current state of banding. The download controls information 619 relates to the download capabilities and state of the printer. This data includes total amount of physical memory available on the printer and number of fonts downloaded. The miscellaneous data 620 includes other data needed to control the outputting of data to the printer.

PRINTER CHARACTERIZATION DATA DETAILS

The generic primer characterization (abbreviated as GPC) is intended to provide an application independent way of describing the total functionality and capabilities of one or more printers. It is done in a such a way that a printer driver will be able to interpret the GPC data, and be able to correctly render text and/or graphics onto a page. The scope of the GPC is intended to cover, but not limited to, raster printing devices such as dot matrix, ink jet, and laser printers. It is expandable to cover vector/plotter type commands. The intended goal of this characterization is to contain enough information so that primer drivers for Microsoft Windows can obtain all of the information they need from it.

The GPC is organized into 3 primary components, device data, font data, and character translation table data. The device data contains a number of different structures that describe all attributes of one or more printers, with the exception of font data. The device data attempts to group related attributes into logically cohesive structures so that similar printer models (such as Epson 9 pin printers or IBM 24 pin printers) can be easily supported from the same table. Each printer model can be described as a collection of attributes, and can explicitly specify which attributes it shares with other primers and which are unique to it. All of the printer control/escape commands are also stored in the device data. The font data is organized in such a way so that each 'font' (defined as a single pitch/point/symbol set/ typeface combination) is described as a separate data resource. The list of fonts that are available for a particular printer, or for a particular font cartridge, are referenced from the device data. The character translation data, currently only used by the Windows Universal Driver Library, provides a means to remap the printers native character set into the Windows ANSI character set. These components are used as resources in the Windows environment, and are grouped together and referenced from a .RC file. The .RC file also contains descriptive strings identifying the name(s) of the printers and other descriptive information.

Definitions are provided below for some the terms contained in this specification.

| | |
|---|---|
| Windows Universal Driver Library | A dynamic link library that runs under Microsoft Windows to serve as a Windows Printer driver. It contains all of the code to handle the GDI interface, present the printer driver user interface, parse and interpret data from a minidriver (see below), and construct and transmit the data stream to the printer. |
| Minidriver | A Windows printer driver that only contains data resources in the format described by this document, and code to handle the GDI interface by dynamically calling the Windows Generic library for all functionality. A minidriver is unusable without the Windows Generic library or some other DLL to serve in its place. |
| Master Units | Values that describe X and Y measurement increments, expressed in units per inch, that all distance and graphics resolution measurements in the device data must be expressible as factors of. Typically the lowest common multiple that all X and Y values in the device data can integrally factor into. |
| OCD | Offset to a command descriptor. All variable sized data, such as printer control/ escape commands, are stored in the HEAP section (see section II, chapter 18 for details). Each printer control/escape command is expressed by a Command Descriptor in the HEAP section, and each OCD refers to the location of a command descriptor relative to the start of the HEAP section. |

DEVICE DATA FILE FORMAT

1. Overview

The device data file provides a way of describing one or more printers as a collection of various attributes. These attributes encompass aspects of how a printer selects a paper size and source, renders text and/or raster data onto a page, ejects the page and selects an output bin. Each of these attributes is described in various data structures in the device data resource file. The data is organized in such a way so that a printing engine need only examine those structures that describe the desired printer model and no others.

The device data file always starts with a header section that describes the size, count, and offsets to each of the other structures in the file. One of the key structures referenced from the header is MODELDATA, which describes the capabilities and physical attributes of one or more printer models. Each MODELDATA structure references which other structures in the device data table that it supports. Multiple printer models may be supported by the same device data table. All printer command/escape codes and other variable length data are stored in the HEAP section. Each printer escape/control command is expressed in a Command Descriptor structure, and the location of each Command Descriptor is referenced from an individual structure as an offset from the beginning of the HEAP section. The following is a brief description of the structures used to characterize various attributes of a printer.

| | |
|---|---|
| MODELDATA | Each MODELDATA structure describes all characteristics of a single printer model. It contains data describing which of the following structures are supported by the device it describes. |
| RESOLUTION | Each RESOLUTION structure corresponds to a single raster graphics resolution that a device is capable of. A single RESOLUTION structure contains all of the information and commands needed to render raster graphic data. |
| PAPERSIZE | Each PAPERSIZE structure describes a single paper size, unprintable regions, and commands required to select it. |
| PAPERQUALITY | Each PAPERQUALITY structure describes various types of paper or other media that a device may render an image on. This is typically used to describe attributes such as plain paper, transparencies, coated paper, etc. |
| PAPERSOURCE | Each PAPERSOURCE describes a paper feed method/bin. |
| PAPERDEST | Each PAPERDEST structure describes a paper output bin/method, and associates a string describing a single bin/method with a printer command. |
| TEXTQUALITY | Each TEXTQUALITY structure describes a text quality attribute such as Draft, NLQ, or Letter Quality, and associates a descriptive string with a printer command. |
| COMPRESSMODE | Each COMPRESSMODE structure describes a data compression mode and printer commands. |
| FONTCART | Each FONTCART structure describes a single font cartridge. |
| PAGECONTROL | Each PAGECONTROL structure contains printer commands needed to control the printer on a per print job basis. Printer commands to initialize the printer, select orientation, etc. are described here. |
| CURSORMOVE | Each CURSORMOVE structure describes printer commands, methods, and limitations for moving the cursor (current active position) around on a page. |
| FONTSIMULATION | Each FONTSIMULTION structure describes a collection of printer commands to enable and disable font attributes such as bold, italic, underline, etc. |
| DEVCOLOR | Each DEVCOLOR structure describes all of the information needed to print colored graphics/text. |
| RECTFILL | Each RECTFILL describes all of the information needed to print filled rectangles. |
| DOWNLOADINFO | Each DOWNLOADINFO describes a collection of data describing the commands and methods used to download fonts to the printer. |

2. Header

The file header (defined as DATAHDR below) provides a way of tracking the size, count, and offset to each of the other structures in a file. The format is as follows:

```
typedef struct                          // size is 128 bytes
{
    short       sMagic;         // reserved, must be
                                // 0x7F00
    WORD        wVersion;       // GPC version
                                // (0x0100)
    POINT       ptMaster;       // Horizontal and
                                // Vertical Master
                                // Units
    DWORD       loHEAP;         // offset from
                                // beginning of file to
                                // HEAP data
    DWORD       dwFileSize;     // size of file in bytes
    WORD        fTechnology;
    WORD        fGeneral;
    char        rgchRes[10];    // 10 bytes reserved
```

-continued

```
    short       sMaxHE;           // # of header entries
    HEADERENTRY rghe[MAXHE];
} DATAHDR, *PDH, far *LPDH;
//----------------------------------------------------------------
// index into array of header entry in DATAHDR
//----------------------------------------------------------------
#define HE_MODELDATA      0
#define HE_RESOLUTION     1
#define HE_PAPERSIZE      2
#define HE_PAPERQUALITY   3
#define HE_PAPERSOURCE    4
#define HE_PAPERDEST      5
#define HE_TEXTQUAL       6
#define HE_COMPRESSION    7
#define HE_FONTCART       8
#define HE_PAGECONTROL    9
#define HE_CURSORMOVE    10
#define HE_FONTSIM       11
#define HE_COLOR         12
#define HE_RECTFILL      13
#define HE_DOWNLOADINFO  14
#define HE_RESERVED1     15
#define MAXHE            16
```

| | |
|---|---|
| sMagic | Reserved word used to identify this as a valid device data table. Must be 0x7F00. |
| sVersion | Version number of GPC data format. This specification uses version 0x0100. (High byte major revision number, low byte minor revision number, 0x0100 = 1.00). Major revision number should reflect GPC format version, minor revision should reflect released version number of minidriver. |
| loHeap | Offset from beginning of file to the start of heap data. All OCDs (Offsets to Command descriptors, see section 16) are expressed as offsets from this location. |
| dwFileSize | Size of entire file/resource in bytes. |
| fTechnology | Bit flags describing technology used by printer models in this minidriver. |
| GPC_TECH_PCL4 | This is printer uses HP PCL (Printer control language) level 4. |
| fGeneral | Bit flags describing general information about this minidriver. |
| GPC_GEN_PRIVATE_HELP | Unidrv should call a private help file (<drvname>.hlp) instead of UNIDRV.HLP as it normally does. |
| ptMaster.x |  |
| ptMaster.y | Describes the Master Units used to express all X and Y axis measurements in the device data as numbers of units per inch. The units chosen here should be the lowest common multiple that all X and Y measurements evenly factor into. For example, if a X movement command is expressed in 1/240", but a graphics resolution horizontally uses 360 DPI, 720 would be the LCM. |
| sMaxHE | Count of HEADERENTRYs used in DATAHDR by this file. This specification uses 15 HEADERENTRIES. |
| rghe[] | Array of HEADERENTRY structures that describe size, count, and offsets to all other structures in file. The HEADERENTRY format is described below. |

```
typedef struct
{
    short sOffset;   // offset from the beginning of this resource
                     // to obtain an entry
    short sLength;   // length of each element of this type
    short sCount;    // number of elements of this type
} HEADERENTRY;
```

| | |
|---|---|
| sOffset | Offset from the beginning of this file to the first structure of the type implied by rghe[] index. If sCount (see below) is greater than one, the n-th structure starts at sOffset+(sLength*(n−1)). If there are no items of this type, both sOffset and sCount will be 0. |
| sLength | Length of each element of this type. |
| sCount | Count of number of elements of this type in the device data table. |

3. MODELDATA structure

The MODELDATA structure describes the attributes of a single printer model. Multiple MODELDATA structures can be combined in a single device data table assuming they share some common data. A single MODELDATA structure contains all of the references to the graphics resolutions, paper sizes, fonts, etc. that are appropriate for that model so that printers sharing some, but not all, of the same characteristics may be combined in a single table. Multiple printer models may be referenced by a single MODELDATA structure assuming they share 100% of their characteristics including available fonts, carriage widths, paper bins, graphics resolutions etc. The stringtable in the .RC file is used to store text strings describing the names of the printer models supported. The Windows Universal Driver library requires that MODELDATA structures are associated with a descriptive string containing the name of the printer model both explicitly in the sIDS field, and implicitly where the stringtable entry with an ID of 1 describes the 1st MODELDATA structure, an ID of 2 describes the 2nd etc.

```
typedef struct
{
    short   cbSize;             // size of structure,
                                // 76 bytes
    short   sIDS;               // stringtable ID for
                                // model name
    WORD    fGeneral;           // General printer
                                // capabilities
    WORD    fCurves;            // Curve Capabilities
    WORD    fLines;             // Line Capabilities
    WORD    fPolygonals;        // Polygonal Capabilities
    WORD    fText;              // Text Capabilities
    WORD    fClip;              // Clipping Capabilities
    WORD    fRaster;            // Raster Capabilities
    WORD    fLText;             // Text Capabilities in
                                // landscape mode
    short   sLeftMargin;        // Unprintable minimum
                                // left margin.
    short   sMaxPhysWidth;      // Maximum physical page
                                // width
    POINT   ptMax;              // Maximum X and Y
                                // printable dimensions in
                                // master units
    POINT   ptMin;              // Minimum X and Y page
                                // dimensions in master
                                // units
    short   sDefaultFontID;     // Resource ID for default
                                // font
    short   sLookAhead;         // Size of lookahead
                                // region in master units
    short   sMaxFontsPage;      // Max number of fonts
                                // printer can place on
                                // single page
                                // −1 if no limit
    short   sCartSlots;         // Number of cartridge
                                // slots on printer
    short   sDefaultCTT;
    short   rgoi[MD_OI_MAX];    //
    short   rgi[MD_I_MAX];      //
} MODELDATA, *PMODELDATA, FAR *
LPMODELDATA;
#define MD_OI_PORT_FONTS     0
#define MD_OI_LAND_FONTS     1
#define MD_OI_RESOLUTION     2
#define MD_OI_PAPERSIZE      3
#define MD_OI_PAPERQUALITY   4
#define MD_OI_PAPERSOURCE    5
#define MD_OI_PAPERDEST      6
#define MD_OI_TEXTQUAL       7
```

| | |
|---|---|
| #define MD_OI_COMPRESSION | 8 |
| #define MD_OI_FONTCART | 9 |
| #define MD_OI_COLOR | 10 |
| #define MD_OI_MEMCONFIG | 11 |
| #define MD_OI_MAX | 12 |
| #define MD_I_PAGECONTROL | 0 |
| #define MD_I_CURSORMOVE | 1 |
| #define MD_I_FONTSIM | 2 |
| #define MD_I_RECTFILL | 3 |
| #define MD_I_DOWNLOADINFO | 4 |
| #define MD_I_MAX | 5 |

| | |
|---|---|
| iIDS | String ID to describe this model name. |
| fGeneral | Bit flags describing General printer capabilities. |
| MD_SERIAL | Must output text serially such as dot matrix printers. (Output data is sorted by Y position so printer is not required to attempt upward Y movement on page). |
| MD_COPIES | Model supports printer printing multiple copies. |
| MD_DUPLEX | Model supports duplex (2 sided) printing. |
| MD_PARAMETERIZE | Model supports HP-PCL parameterized escape sequences. |
| MD_ALIGN_BASELINE | Align text output on the baseline of character. Default is the top of character bounding box. |
| MD_ROTATE_FONT_ABLE | Model can rotate hardware fonts to match current orientation. |
| MD_LANDSCAPE_GRX_ABLE | Model can rotate graphic image to suit orientation. |
| MD_LANDSCAPE_RT90 | Describes relationship between portrait and landscape orientation. If set, landscape is portrait rotated 90 degrees counter-clockwise (i.e. the righthand side of an image is printed first). Otherwise, the rotation is 270 degrees counter-clockwise (i.e. the lefthand side of an image comes out first). For printers with no set-orientation command, do NOT set this bit. |
| MD_TEXT_ONLY | Model cannot print raster graphics. |
| MD_NO_ADJACENT | Model can not fire adjacent horizontal pins on printhead. |
| MD_FONT_MEMCFG | Memory referenced at rgoi[MD_OI_MEMCONFIG] is used for download fonts ONLY, otherwise assume that both bitmaps and download fonts are limited by memory values listed here. |
| MD_USE_CURSOR_ORIG | Cursor origin is calculated from PAPERSIZE. prCursorOrig values. Otherwise, assume cursor origin is the upper left corner of the printable region. |
| MD_WHITE_TEXT | Model can print white text on black background. Use commands from DEVCOLOR data structure. |
| MD_PCL_PAGEPROTECT | Model supports HP-PCL5 style page protection. |
| MD_MARGINS | Model will allow user to access dialog to alter unprintable areas. Provided for compatibility with Windows 3.0 Epson drivers. |

The following 4 flags, fCurves, fLines, fPolygonals, and fClip are part of the standard Windows GDIINFO structure and are used to describe various types of vector graphics capabilities. For individual printer drivers that wish to support these capabilities, the driver must contain code to handle the DDI call without attempting to call UNIDRV.DLL, and have the appropriate bit set to indicate this ability. For example, if CC_CIRCLES in fCurves is set, the mini-driver must handle the DDI Output( ) call when style=OS_CIRLE. If a mini-driver does not contain code beyond what is required do call the Windows Universal Driver library, these fields should be left blank.

| | |
|---|---|
| fCurves | Bit flags describing Curve Capabilities. |
| CC_NONE | Curves not supported. This is the default option. |
| CC_CIRCLES | Can do circles |
| CC_PIE | Can do pie wedges |
| CC_CHORD | Can do chord arcs |
| CC_ELLIPSES | Can do ellipses |
| CC_WIDE | Can do wide lines |
| CC_STYLED | Can do styled lines |
| CC_WIDESTYLED | Can do wide styled lines |
| CC_INTERIORS | Can do interiors |
| fLines | Bit flags describing Line Capabilities |
| LC_NONE | Lines not supported. This is the default option. |
| LC_POLYLINE | Can do polylines |
| LC_MARKER | Can do markers |
| LC_POLYMARKER | Can do polymarkers |
| LC_WIDE | Can do wide lines |
| LC_STYLED | Can do styled lines |
| LC_WIDESTYLED | Can do wide styled lines |
| LC_INTERIORS | Can do interiors |
| fPolygonals | Bit flags describing Polygonal Capabilities. |
| PC_NONE | Polygonals not supported. This is the default option. |
| PC_POLYGON | Can do polygons |
| PC_RECTANGLE | Can do rectangles |
| PC_WINDPOLYGON | Can do winding polygons |
| PC_TRAPEZOID | Can do trapezoids |
| PC_SCANLINE | Can do scanlines |
| PC_WIDE | Can do wide borders |
| PC_STYLED | Can do styled borders |
| PC_WIDESTYLED | Can do wide styled borders |
| PC_INTERIORS | Can do interiors |

| | | |
|---|---|---|
| fClip | Bit flags describing Clipping Capabilities | |
| CP_NONE | No clipping at device level. | |
| CP_RECTANGLE | Device Output clips to rectangles. | |

The following flag fRaster is used to describe various raster capabilities. This field should be left blank and will be provided by UNIDRV.DLL to GDI.

| | |
|---|---|
| fRaster | Bit flags describing Raster Capabilities. |
| RC_NONE | No Raster Capabilities |
| RC_BITBLT | Can do bitblt |
| RC_BANDING | Requires banding support |
| RC_SCALING | Requires scaling support |
| RC_BITMAP64 | supports >64k bitmaps |
| RC_GDI20_OUTPUT | support Windows 2.0 functions |
| RC_GDI20_STATE | dc has a state block |
| RC_SAVEBITMAP | can save bitmaps locally |
| RC_DI_BITMAP | can do device independent bitmaps |
| RC_PALETTE | can do color palette management |
| RC_DIBTODEV | can do SetDIBitsToDevice |
| RC_BIGFONT | does BIGFONTs |
| RC_STRETCHBLT | can do StretchBlt |
| RC_FLOODFILL | can do FloodFill |
| RC_STRETCHDIB | can do StretchDIBits |
| fText | Bit flags describing the devices hardware font capabilities. |
| TC_OP_CHARACTER | Can do OutputPrecision CHARACTER. This bit should be set if the device has any hardware fonts. |
| TC_OP_STROKE | Can do OutputPrecision STROKE. Same as above except can rotate text (not used). |
| TC_CP_STROKE | Can do ClipPrecision STROKE. Can clip text to boundary, typically not used. |
| TC_CR_90 | Device can do 90 degree character rotation, independent of current page orientation. (not used) |
| TC_CR_ANY | Device can do any character rotation, independent of current page orientation. (not used) |
| TC_SF_X_YINDEP | Device can do scaling independent of X and Y. |
| TC_SA_DOUBLE | Device can do doubled character for scaling. |
| TC_SA_INTEGER | Device can do integer multiples for scaling. |
| TC_SA_CONTIN | Device can do any multiples for scaling. |
| TC_EA_DOUBLE | Device supports bold characters. |
| TC_IA_ABLE | Device can italicize characters. |
| TC_UA_ABLE | Device can underline characters. |
| TC_SO_ABLE | Device can strikeout characters. |
| TC_RA_ABLE | Device can print raster fonts. |
| TC_VA_ABLE | Device can print vector fonts. (not used) |
| fLText | Bit flags describing Text Capabilities in landscape mode. These flags are the same as those described under fText. |
| sLeftMargin | Size of left unprintable region imposed by using this device. Typically only appropriate for dot matrix devices. Please see the section on determining printable regions for a detailed explanation. |
| sMaxPhysWidth | Maximum physical paper width of this device. Used to specify upper limit for user defined paper sizes. Expressed in Master Units. |
| ptMax.x, ptMax.y | Maximum printable X and Y dimensions expressed in master units. |
| ptMin.x, ptMin.y | Minimum allowable X and Y page dimensions expressed in master units |
| sDefaultFontID | Resource ID for desired default font to use in mapping logical font request to physical font when application doesn't request specific font. |
| sLookAhead | Size of lookahead region, expressed in Master Units, to use in controlling ordering of text/graphics output for inkjet printers. Typically 0 for most printers. If not 0, uses algorithm described in HP Deskjet documentation. |
| sMaxPageFonts | Maximum number of fonts this printer model can place on a single page, NOT_USED (−1) if no limit. |
| sCartSlots | Number of physical font cartridge slots available on this model. |
| sDefaultCTT | Index to default character translation table resource for this device. This may zero, a positive or negative number. If this is 0, do not use any character translation tables unless specifically requested in a PFM file. If this is a negative number, the Universal Driver library will take its absolute value and use the character translation table resource from the Windows Generic library with this ID. See the section on Character Translation Tables for a description of the predefined character translation tables supported by the generic library. If this is a positive number, the generic library will use the driver-defined character translation table resource with this value. |
| rgoi[] | Array of offsets into the HEAP section that refer to a null terminated list of (1 based) indices of various structures supported by this model. Used to describe which structures contained in the table are supported by this printer model. The lists refer to the structures by index value rather than by an ID value. The order of the items in the list is also the order in which they should be presented by the User interface. If no structures of a certain type |

| | |
|---|---|
| MD_OI_PORT_FONTS | exist, there must be a valid offset to a null value in the HEAP to indicate this. A more detailed description of each list is provided below. Offset in HEAP to null terminated array of indices of PFM resources of resident portrait fonts that are supported by this model. All fonts are contiguously numbered, starting from 1, as resources in the .RC file. The format of this list is that the first two numbers in this list define an inclusive range of font number that are supported by this model, with each additional supported font explicitly listed following this. For example, if a minidriver supports 100 fonts (numbered 1–100) and the font list referenced by MD_OI_PORT_FONTS contains 2, 60,70,71, and 98, this would indicate that fonts 2–60,70,71, and 98 are supported by this model and all others are not. Note this value must always refer to a valid offset into the heap. |
| MD_OI_LAND_FONTS | Offset in HEAP to null terminated array of indices of PFM resources of resident landscape fonts that are supported by this model. All fonts are contiguously numbered, starting from 1, as resources in the .RC file. The format of this list is that the first two numbers in this list define an inclusive range of font number that are supported by this model, with each additional supported font explicitly listed following this. For example, if a minidriver supports 100 fonts (numbered 1–100) and the font list referenced by MD_OI_LAND_FONTS contains 2, 60,70,71, and 98, this would indicate that fonts 2–60,70,71, and 98 are supported by this model and all others are not. Note this value must always refer to a valid offset into the heap. |
| MD_OI_RESOLUTION | Offset to a null terminated list of integers referring to indices of RESOLUTION structures that are supported by this model. This value must contain a valid heap reference. |
| MD_OI_PAPERSIZE | Offset to a null terminated list of integers referring to indices of PAPERSIZE structures supported by this model. |
| MD_OI_PAPERQUALITY | Offset to a null terminated list of integers referring to indices of PAPER-QUALITY structures supported by this model. |
| MD_OI_PAPERSOURCE | Offset to a null terminated list of integers referring to indices of PAPERSOURCE structures supported by this model. |
| MD_OI_PAPERDEST | Offset to a null terminated list of integers referring to indices of PAPER-DESTINATION structures used to store data that describe paper destinations that are supported by this model. |
| MD_OI_TEXTQUAL | Offset to a null terminated list of integers referring to indices of TEXTQUALITY structures used to store data that describe text qualities supported by this model. |
| MD_OI_COMPRESSION | Offset to a null terminated list of integers referring to indices of COMPRESS-MODE structures supported by this model. |
| MD_OI_FONTCART | Offset to a null terminated list of integers referring to indices of FONTCART structures describing cartridge fonts supported by this model. |
| MD_OI_COLOR | Offset to a null terminated list of integers referring to indices of DEVCOLOR structures to use for printing colored text and color graphics with this model. If a model supports a 'pixel' color model, it should be listed as the first/default value here. Additional information is available in the section on the "DEVCOLOR" structure. |
| MD_OI_MEMCONFIG | Offset to a null terminated list of pairs of integers describing possible memory configurations for this model (expressed in KB). For each pair, the 1st number describes the 'real' amount of memory UNIDRV will use in any calculations, and the 2nd number describes the amount to be displayed from the user interface. This is done to compensate for the fact the full amount of memory is typically not available for use, the printer often reserves a portion for its own internal use. A value of –1 in the list will reflect that 0 KB of memory is a possible configuration. Note that how these values should be used will be determined by the MD_FONT_MEMCONFIG flag value in MODELDATA.fGeneral. |
| rgi[] | Array of integers that refer to the indices of various structures supported by this model. The lists refer to the structures by index (0 based) value rather than by an ID value. A more detailed description of each item is provided below. |
| MD_I_PAGECONTROL | Specifies the index of which PAGECONTROL structure is supported by this printer model. |

| | |
|---|---|
| MD_I_CURSORMOVE | Specifies the index of which CURSORMOVE structure supported by this model. |
| MD_I_FONTSIM | Specifies the index of which FONTSIMULATION structure supported by this model, NOT_USED (−1) if this device does not support a FONTSIMULATION structure. |
| MD_I_RECTFILL | Describes which RECTFILL structure supported by this model, , NOT_USED (−1) if none, 0 for 1st, etc. |
| MD_I_DOWNLOADINFO | Specifies the index value describing which DOWNLOADINFO to use for this model, NOT_USED (−1) if none, 0 for 1st, etc. |

4. RESOLUTION structure

A RESOLUTION structure is used to describe a single graphics resolution. It contains all of the information needed to encode and transmit bitmap raster graphics data.

```
typedef struct
    {
    short       cbSize;         // size of structure, 40 bytes
    short       sIDS;           // String ID to a formatted
                                // string for displaying resolution
    WORD        fDump;          // Dump method flags.
    WORD        fBlockOut;      // Block out method flags.
    WORD        fCursor;        // Cursor position flags.
    WORD        fDitherBrush;   // brush type describing
                                // dithering methods available
    POINT       ptTextScale;    // relationship between master
                                // units and text units.
    POINT       ptScaleFac;     // relationship between graphics
                                // and text scale factors.
                                // expressed in powers of 2.
    short       sNPins;         // Minimum height of the image
                                // to be rendered together.
    short       sPinsPerPass;   // Physical number of pins fired
                                // in one pass.
    short       sTextYOffset;   // offset from top of graphics
                                // output that of text output
    short       sMinBlankSkip;  // Min. # of bytes of null data
                                // that must occur before
                                // compression (strip null data
                                // only) will occur
    short       sSpotDiameter;  // size of dot at this resolution
    OCD         rgocd[RES_OCD_MAX];
    } RESOLUTION, *PRESOLUTION, FAR *
LPRESOLUTION;
#define     RES_OCD_SELECTRES       0
#define     RES_OCD_BEGINGRAPHICS   1
#define     RES_OCD_ENDGRAPHICS     2
#define     RES_OCD_SENDBLOCK       3
#define     RES_OCD_ENDBLOCK        4
#define     RES_OCD_MAX             5
```

| | |
|---|---|
| sIDS | String ID of a formatted string for displaying this resolution. |
| fDump | Dump method flags. Bit flags describing how to build raster graphic data for this resolution. |
| RES_DM_GDI | GDI bitmap format. 8 pixels per horizontal byte. This bit typically only set for laser printers or devices that map a byte into 8 horizontal pixels. It should not be set for most dot matrix device that map one or more bytes into some number of vertical pixels. |
| RES_DM_LEFT_BOUND | Attempt to optimize by left side of bounding rectangle. Setting this flag implies that the cursor will be moved to the start of the left side of the bounding rectangle prior to sending graphic data. If this flag is not set, the cursor will be moved to the leftmost position on page, and null graphic data will be sent to control horizontal positioning of the graphic image. |
| RES_DM_COLOR | Color support is available for this resolution. |
| fBlockOut | Block out method flags. Bit flags describing limits/methods of sending a block of raster data to printer. |
| RES_BO_UNIDIR | Must enable Unidirectional printing for this resolution. |
| RES_BO_NO_ADJACENT | Printer can not fire adjacent horizontal pins on printhead. |
| RES_BO_LEADING_BLNKS | Strip leading blanks if any null raster data occurs |
| RES_BO_TRAILING_BLNKS | Strip trailing blanks if any null raster data occurs |
| RES_BO_ENCLOSED_BLNKS | Strip enclosed blanks if sMinBlankSkip or more bytes of null data occur |
| RES_BO_OEM_FILTER_GRX | Use callback function in minidriver to alter format of graphic data before sending to printer. |
| RES_BO_RESET_FONT | Must reselect current font after blockout command. |
| RES_BO_RESET_CMP | Must reset compression mode after entering graphics mode. |
| fCursor | Cursor Positioning Flags. Bit flags describing cursor position after sending block of raster data. Unless otherwise specified here, it is assumed that the X and Y cursor position is at the end of the block of raster data. |
| RES_CUR_X_POS_ORG | X Position is at X start point of graphic data after printing block of graphic data. |
| RES_CUR_X_POS_AT_0 | X position at leftmost position on page after printing block of graphic data. |
| RES_CUR_Y_POS_AUTO | Y position automatically moves to next Y row after printing block of graphic data. |

| | | |
|---|---|---|
| RES_CUR_CR_GRX_ORG | CR moves X position to the X start point of graphics data. | |
| Resolution.fDitherBrush | ID value describing default dithering techniques for this resolution. The end user may opt to select any of the dithering methods. Version 1.0 of the Windows generic library currently supports 4 ID values, for 3 methods used to implement dithering and 1 to indicate no dithering. This field specifies what kind of dither brushes look good on this device in this resolution. For the sake of discussion, assume that we are trying to get 50% gray on the screen. | |
| RES_DB_FINE | The dither pattern is dispersed. Dots are spread out evenly across the image, using a predefined algorithm. | |
| RES_DB_COURSE | The dither pattern is clustered. Dots are grouped together so that overall 50% of the image is covered. | |
| RES_DB_NONE- | No dithering. | |
| RES_DB_LINEART | The dither pattern is optimized for color graphics images with sharp separation. Not recommended to select as default, not supported for color graphics. | |
| ptTextScale.x, ptTextScale.y | Contains the ratio between the master unit and the units (in DPI) at which hardware fonts widths are represented at this resolution. The master units are divided by the numbers in this field to get the hardware font metrics in DPI. For example, if master unit is 720 and the hardware fonts are digitized at 180, Resolution.ptTextScale is 4. | |
| ptScaleFac.x, ptScaleFac.y | Describes the ratio of hardware font resolution to graphics resolution expressed in power of 2. (i.e. log (Text Unit/ Graphics Unit) in base 2). If Text Unit is 180, but graphics is 90 DPI, then this field contain 1. If Text Unit equals graphics unit then this field contains 0. Typically this is only used for laser printers to describe differences between text and graphics resolutions. | |
| sNPins | Minimum height (in pins) of the image to be rendered together. This value is typically the same as sPinsPerPass for non-interlaced graphics modes and sPinsPerPass * 2 for single interlaced graphics modes. | |
| sPinsPerPass | Physical number of pins fired in one pass of the printhead. | |
| sTextYOffset | Y Distance to reposition hardware fonts by to correctly align baselines with those of bitmapped fonts. | |
| sMinBlankSkip | Minimum number of bytes of null graphic data that must occur before compression (internal bitstripping of null raster graphic data only) will occur. This value only applies to internal bit stripping. If this RESOLUTION supports internal bit stripping, the suggested value should be the number of bytes of raster data required to move ¼ inch. Selecting smaller values will cause some performance loss due to the overhead of entering/existing graphics mode to send X movement commands. | |
| sSpotDiameter | The pixel size of the device at this resolution. The pixel size is defined as D × R, where D is the average pixel diameter and R is the resolution of the display device. An ideal pixel is defined as a circle that just touch (but not overlap) the diagonally adjacent pixels. An ideal pixel has a diameter of SQRT(2), because SQRT(2) is the diagonal of a unit square (a square with side equal to 1). This value is used to determine how much pixel overlap occurs, or how wide of a gap to expect between pixels. This allows compensation for these defects when rasterizing images. A table of suggested values will be provided to assist minidriver creators to determine appropriate values to enter based upon resolution and physical attributes of the device. | |
| rgocd[] | Array of offsets to Command descriptors in the HEAP section that refer to a various printer commands to print raster graphics at this resolution. A more detailed description of each list is provided below. | |
| RES_OCD_SELECTRES | Offset to the Command Descriptor to select this graphic resolution. | |

| | |
|---|---|
| RES_OCD_BEGINGRAPHICS | Offset to the printer command to enter graphics mode if appropriate. |
| RES_OCD_ENDGRAPHICS | Offset to the printer command to end graphics mode if appropriate. Send after last row of raster data sent. |
| RES_OCD_SENDBLOCK | Offset to printer command to send a block of bitmapped data. |
| RES_OCD_ENDBLOCK | Offset to printer command to be sent after a block of raster data has been sent from ocdSendBlock. |

5. PAPERSIZE structure

The PAPERSIZE structure describes data about a single paper size. It describes the physical and printable dimensions of the page and other information required to instruct the printer to correctly handle this paper size.

```
typedef struct
    {
    short       cbSize;         // size of structure, 32 bytes
    short       sPaperSizeID;   // If sPaperSizeID is < 256 then
                                // it's predefined.
                                // If it's = 256, allow user
                                // defined sizes.
                                // If it's >= 257, it's driver-
                                // defined and is the string ID to
                                // name this driver-defined
                                // PAPERSIZE
    WORD        fGeneral;       // General flag to describe info
                                // about this size
    WORD        fPaperType;     // Bit field to describe this size,
                                // used by PAPERSOURCE
    POINT       ptSize;         // X and Y dimension in master
                                // units.
    RECT        rcMargins;      // Specifies the left, top, right,
                                // bottom unprintable margins in
                                // master units.
    POINT       ptCursorOrg;    // Cursor origin relative to
                                // physical page origin.
    POINT       ptLCursorOrg;   // Cursor origin relative to
                                // physical page origin in
                                // landscape.
    short       sReserved;      // so DW aligned
    OCD         ocdSelect;      // Command Descriptor to select
                                // this Paper Size.
    } PAPERSIZE, * PPAPERSIZE, FAR * LPPAPERSIZE;
//--------------------------------------------------------------
// Predefined PAPERSIZE ID values
//--------------------------------------------------------------
#define DMPAPER_FIRST           DMPAPER_LETTER
#define DMPAPER_LETTER          1    // Letter
                                     // 8½ x 11 in
#define DMPAPER_LETTERSMALL     2    // Letter Small
                                     // 8½ x 11 in
#define DMPAPER_TABLOID         3    // Tabloid
                                     // 11 x 17 in
#define DMPAPER_LEDGER          4    // Ledger
                                     // 17 x 11 in
#define DMPAPER_LEGAL           5    // Legal
                                     // 8½ x 14 in
#define DMPAPER_STATEMENT       6    // Statement
                                     // 5½ x 8½ in
#define DMPAPER_EXECUTIVE       7    // Executive"
                                     // 7½ x 10 in
#define DMPAPER_A4              8    // A3 297 x
                                     // 420 mm
#define DMPAPER_A4              9    // A4 210 x
                                     // 297 mm
#define DMPAPER_A4SMALL         10   // A4 Small
                                     // 210 x 297 mm
#define DMPAPER_A5              11   // A5 148 x
                                     // 210 mm
#define DMPAPER_B4              12   // B4 250 x 354
#define DMPAPER_B5              13   // B5 182 x
                                     // 257 mm
#define DMPAPER_FOLIO           14   // Folio
                                     // 8½ x 13 in
#define DMPAPER_QUARTO          15   // Quarto
                                     // 215 x 275 mm
#define DMPAPER_10x14           16   // 10x14 in
#define DMPAPER_11x17           17   // 11x17 in
#define DMPAPER_NOTE            18   // Note
                                     // 8½ x 11 in
#define DMPAPER_ENV_9           19   // Envelope #9
                                     // 3⅞ x 8⅞
#define DMPAPER_ENV_10          20   // Envelope #10
                                     // 4⅛ x 9½
#define DMPAPER_ENV_11          21   // Envelope #11
                                     // 4½ x 10⅜
#define DMPAPER_ENV_12          22   // Envelope #12
                                     // 4 \276 x 11
#define DMPAPER_ENV_14          23   // Envelope #14
                                     // 5 x 11½
#define DMPAPER_CSHEET          24   // C size sheet
#define DMPAPER_DSHEET          25   // D size sheet
#define DMPAPER_ESHEET          26   // E size sheet
#define DMPAPER_ENV_DL          27   // Envelope DL
                                     // 110 x 220 mm
#define DMPAPER_ENV_C5          28   // Envelope C5
                                     // 162 x 229 mm
#define DMPAPER_ENV_C3          29   // Envelope C3
                                     // 324 x 458 mm
#define DMPAPER_ENV_C4          30   // Envelope C4
                                     // 229 x 324 mm
#define DMPAPER_ENV_C6          31   // Envelope C6
                                     // 114 x 162 mm
#define DMPAPER_ENV_C65         32   // Envelope C65
                                     // 114 x 229 mm
#define DMPAPER_ENV_B4          33   // Envelope B4
                                     // 250 x 353 mm
#define DMPAPER_ENV_B5          34   // Envelope B5
                                     // 176 x 250 mm
#define DMPAPER_ENV_B6          35   // Envelope B6
                                     // 176 x 125 mm
#define DMPAPER_ENV_ITALY       36   // Envelope
                                     // 110 x 230 mm
#define DMPAPER_ENV_MONARCH     37   // Envelope
                                     // Monarch
                                     // 3.875 x 7.5 in
#define DMPAPER_ENV_PERSONAL    38   // 6¾ Envelope
                                     // 3⅝ x 6½ in
#define DMPAPER_FANFOLD_US      39   // US Std
                                     // Fanfold
                                     // 14⅞ x 11 in
#define DMPAPER_FANFOLD_        40   // German Std
    STD_GERMAN                       // Fanfold
                                     // 8½ x 12 in
#define DMPAPER_FANFOLD_        41   // German Legal
    LGL_GERMAN                       // Fanfold
                                     // 8½ x 13 in
#define DMPAPER_LAST            DMPAPER_
                                FANFOLD_LGL_
                                GERMAN
#define DMPAPER_USER            256
    sPaperSizeID        Integer ID value for the
                        string used to describe this
                        paper size. If sPaperSizeID
                        is < 256 then it's a
                        predefined size described in
                        drivinit.h and provided from
                        the printing engine. If it
                        is = 256, then allow the end
                        user to define sizes within
                        the range as defined through
                        the values in
                        MODELDATA defining the
                        maximum and minimum page
                        sizes. If it's >= 257, it is
```

| | |
|---|---|
| fGeneral | driver-defined and the ID value references the string ID of the name of the driver-defined PAPERSIZE. General flag to describe info about this size. Bit flags are as follows: |
| PS_CENTER | Center the printable area along the paper path. |
| PS_ROTATE | Exchange the X and Y page dimensions. Note: margins are NOT rotated. This bit is used only when a standard-size paper (e.x. envelopes) does not suit the printer's paper feeding method. The margins should be given in terms of the final paper orientation. |
| PS_SUGGEST_LNDSCP | Landscape orientation required for text on this page/envelope to come out in the 'normal' sense. Selecting this PAPERSIZE should cause the User Interface to propose landscape as the default orientation, which the end user may then choose to accept or override. |
| PS_EJECTFF | Eject page by sending CURSORMOVE.rgocd [CM_OCD_FF] command. This bit is ORed with the PSRC_EJEECTFF bit in PAPERSOURCE.fGeneral, and if neither one is set, assume movement to next page controlled by Y movement commands. |
| fPaperType | Bit field to characterize this size, used to specify valid PAPERSOURCE and PAPERSIZE combinations. Only one bit may be set in this field per PAPERSIZE. Four bits are predefined (as listed below), but a mini driver is free to use the remaining bits as needed. Each fPaperType field in PAPERSOURCE contains one or more bits that are set to describe PAPERSIZES that are appropriate for it. To determine a valid PAPERSIZE and PAPERSOURCE combination, PAPERSIZE.fPaperType is combined with PAPERSOURCE.fPaperType by a logical AND, if the result is non-zero that combination is valid, otherwise it is not. Predefined bit fields are as follows although others may also be used. |
| PS_T_STD | Standard paper size |
| PS_T_LARGE | Large paper size |
| PS_T_ENV | Envelope |
| PS_T_LRGENV | Large envelope |
| ptSize.x, ptSize.y | X and Y paper size dimensions expressed in master units. |
| rcMargins | Describes left, top, right, bottom unprintable margins expressed in master units. |
| ptCursorOrg.x, ptCursorOrg.y | Cursor X and Y origins relative to physical page origin. These fields are used as the origin coordinates for all movement commands, and are typically zero, but can be used to specify a cursor origin in a position other than the physical corner of the page if needed. Note that these values are only used if the MD_USE_CURSOR_ORIG bit is set in MODELDATA.fGeneral. |
| ptLCursorOrg.x, ptLCursorOrg.y | Cursor X and Y origin relative to physical page origin in landscape. |
| ocdSelect | Offset to command descriptor to select this paper size. |

6. PAPERQUALITY structure

The PAPERQUALITY structure describes a single paper type. It is used to characterize attributes of types of paper (such as grades of paper, transparencies, etc.) or special concerns introduced by using a particular paper quality.

```
typedef struct
  {
  short     cbSize;          // size of structure, 12 bytes
  short     sPaperQualID;    // If sPaperQualID <= 256
                             // then it's predefined by
                             // unidrv, otherwise, it is the
                             // string ID.
  WORD      wReserved;       // so DW aligned
  DWORD     dwReserved;      // for future use
  OCD       ocdSelect;       // Command Descriptor to
                             // select this Paper Quality.
  } PAPERQUALITY, * PPAPERQUALITY, FAR *
  LPPAPERQUALITY;
```

| | |
|---|---|
| sPaperQualID | Integer ID value for the string used to describe this paper quality. If sPaperQualID is < 256 then it's a predefined size described in print.h and provided from the printing engine. If it's >= 257, it is driver-defined and the ID value references the string ID of the name of the driver-defined PAPERQUALITY. |
| ocdSelect | Offset to command descriptor to select this paper quality. |

7. PAPERSOURCE structure

The PAPERSOURCE structure describes a single paper source, feed method, or bin. It is used to characterize limits or special concerns introduced by using a particular paper source.

```
typedef struct
  {
  short     cbSize;          // size of structure, 16 bytes
  short     sPaperSourceID;  // If sPaperSourceID <= 256
                             // then it's predefined by unidrv,
                             // otherwise, it is the string ID.
  short     fGeneral;        // General purpose Bit field
  short     fPaperType;      // Bit field to describe
                             // PAPERSIZEs applicable for
                             // this source
  short     sTopMargin;      // Top margin introduced by the
                             // feed method.
  short     sBottomMargin;   // Bottom margin introduced by
                             // the feed method.
  short     sReserved;       // so DW aligned
  OCD       ocdSelect;       // Command Descriptor to select
                             // this Paper source.
  } PAPERSOURCE, * PPAPERSOURCE, FAR *
  LPPAPERSOURCE;
```

//------------------------------------------------------------------
// Predefined PAPERSOURCE ID values (from print.h)
//------------------------------------------------------------------
```
#define DMBIN_FIRST          DMBIN_UPPER
#define DMBIN_UPPER          1
#define DMBIN_ONLYONE        1
#define DMBIN_LOWER          2
#define DMBIN_MIDDLE         3
#define DMBIN_MANUAL         4
#define DMBIN_ENVELOPE       5
#define DMBIN_ENVMANUAL      6
#define DMBIN_AUTO           7
#define DMBIN_TRACTOR        8
#define DMBIN_SMALLFMT       9
#define DMBIN_LARGEFMT       10
#define DMBIN_LARGECAPACITY  11
#define DMBIN_CASSETTE       14
#define DMBIN_LAST           DMBIN_CASSETTE
#define DMBIN_USER           256    /* device
                                       specific bins
                                       start here */
```

| | |
|---|---|
| sPaperSourceID | Integer ID value for the string used to describe this paper source. If sPaperSizeID is < 256 then it's a predefined size described in print.h and provided from the printing engine. Otherwise, it is driver-defined and the ID value references the string ID of the name of the driver-defined PAPERSOURCE. |
| fGeneral | General flag to describe info about this source. |
| PSRC_EJECTFF | Eject page by sending CURSORMOVE.rgocd[CM_OCD_FF] command. This bit is ORed with the PS_EJEECTFF bit in PAPERSIZE.fGeneral, and if neither one is set, assume movement to next page controlled by Y movement commands. |
| PSRC_MAN_PROMPT | Prompt user to insert paper prior to each page. This bit should only be set for paper sources using an ID of DMBIN_MANUAL and the device is incapable of prompting the user itself. |
| fPaperType | Bit field used to characterize the sizes of paper this feed method supports. Each PAPERSOURCE must set at least one bit in fPaperType to describe the PAPERSIZEs that can be used with this feed method. If all PAPERSIZEs are supported, all bits should be set. The same bit in PAPERSIZE.fPaperType and PAPERSOURCE.fPaperType must be set for that to be a valid size/source combination. See the definition of this field under PAPERSIZE for more details. |
| sTopMargin, sBottomMargin | Unprintable top and bottom margins that are a result of using this paper source expressed in MasterUnits. |
| ocdSelect | Offset to command descriptor to select this paper source. |

8. PAPERDEST structure

The PAPERDEST structure associates a string ID with an offset to a printer command (OCD) to describe paper output bins/destinations.

```
typedef struct
    {
    short    cbSize;       // size of structure, 8 bytes
    short    sID;          // If sID <= 256 then it's predefined
                           // otherwise, it is the stringtable ID.
    short    fGeneral;     // General purpose Bit field
    OCD      ocdSelect;    // Command Descriptor to select this
                           // attribute.
    } PAPERDEST, * PPAPERDEST, FAR * LPPAPERDEST;
```

| | |
|---|---|
| sID | Integer ID value for the string used to describe this paper destination. Currently, there are no predefined paper destinations defined. If sID is < 256 then it would be a predefined paper destination described in print.h and provided by the printing engine. Otherwise, it is driver-defined and the ID value references the string ID of the name of the driver-defined paper destination. |
| fGeneral | General flag to describe information about this paper destination. |
| PDST_JOBSEPARATION | Paper source support job separation feature. Command tfrom PAGECONTROL is sent after ENDDOC but before printers reset command. |
| ocdSelect | Offset to a command descriptor to select this paper destination. |

9. TEXTQUALITY structure

The TEXTQUALITY structure describes an attribute of hardware fonts such as NLQ, Draft, etc.

```
typedef struct
    {
    short    cbSize;       // size of structure, 8 bytes
    short    sID;          // If sID <= 256 then it's predefined
                           // otherwise, it is the string ID.
    short    fGeneral;     // General purpose Bit field
    OCD      ocdSelect;    // Command Descriptor to select this
                           // text quality.
    } TEXTQUALITY, * PTEXTQUALITY, FAR * LPTEXTQUALITY;
```

| | |
|---|---|
| sID | Integer ID value for the string used to describe this text quality. If sID is < 256 then it's a predefined text quality described in minidriv.h and is provided by the printing engine. Otherwise, it is driver-defined and the ID value references the string ID of the name of the text quality. |
| fGeneral | General flag to describe information about this text quality. |
| ocdSelect | Offset to a command descriptor to select this text quality. |

10. COMPRESSMODE structure

The COMPRESSMODE structure describes methods in which data can be sent to the printer in condensed form, and the printer commands needed to control them.

```
typedef struct
    {
    short    cbSize;                    // size of structure,
                                        // 8 bytes
    WORD     iMode;                     // ID for type of
                                        // compression
                                        // mode
    OCD      rgocd[CMP_OCD_MAX];
    } COMPRESSMODE, * PCOMPRESSMODE, FAR * LPCOMPRESSMODE;
#define CMP_OCD_BEGIN    0
#define CMP_OCD_END      1
#define CMP_OCD_MAX      2
```

-continued

| | |
|---|---|
| iMode | ID values for compression mode described. Supported values listed below: |
| CMP_ID_RLE | Run Length encoding. |
| CMP_ID_TIFF40 | TIFF 4.0 compression. |
| CMP_ID_DELTAROW | Delta Row compression. |
| rgocd[] | Array of offsets to Command descriptors in the HEAP section that refer to a various printer commands to control data compression modes. A more detailed description of each list is provided below. |
| CMP_OCD_BEGIN | Printer command to enable this compression mode. |
| CMP_OCD_END | Printer command to end this compression mode |

11. FONTCART structure

The FONTCART structure contains data describing font cartridges. Each FONTCART structure describes a single font cartridge, which in turn references which font resources are contained in that cartridge. This allows different font cartridges to share font data if appropriate.

```
typedef struct
    {
    short       cbSize;                     // size of
                                            // structure,
                                            // 12 bytes
    short       sCartNameID;                // stringtable
                                            // ID for
                                            // cartridge
                                            // name
    WORD        orgwPFM[FC_ORGW_MAX];       // offset to
                                            // arrays of
                                            // indices of
                                            // PFM
                                            // resources
                                            // for fonts
    WORD        fGeneral;                   // general bit
                                            // flags
    short       sReserved;                  // Distance to
                                            // shift chars by
    } FONTCART, * PFONTCART, FAR * LPFONTCART;
#define FC_ORGW_PORT            0           // offset for list
                                            // of portrait
                                            // fonts
#define FC_ORGW_LAND            1           // offset for list
                                            // of landscape
                                            // fonts
#define FC_ORGW_MAX             2
```

| | |
|---|---|
| sCartNameID | Stringtable ID value for cartridge name. Since MODELDATA.sIDS reserves ID values from 1–256, the ID value must be 257 or larger. |
| orgwPFM[] | Offset in HEAP to null terminated array of indices of PFM resources of fonts found on this cartridge. Separate lists are maintained for portrait and landscape fonts. All fonts are contiguously numbered, starting from 1, as resources in the .RC file. The format of this list is that the first two numbers in this list define an inclusive range of font number that are supported by this model, with each additional supported font explicitly listed following this. For example, if a minidriver supported 100 fonts (numbered 1–100) and a particular FONTCART.orgwPFM[] referred to the list 2, 60,70,71, and 98, this indicated that fonts 2–60, 70,71, and 98 are supported by this FONTCART structure and all others are not. Note this value must always refer to a valid offset into the heap. |
| fGeneral | General purpose bit flag. Flag values are TBD to describe the contents of any data at oHeapExtra. |

12. PAGECONTROL structure

The PAGECONTROL structure contains several OCDs used for printer commands used to select attributes of a single page or print job. In addition, there is information describing the order in which commands should be sent to the printer at the beginning of a document and beginning of a page.

```
typedef struct
    {
    short       cbSize;             // size of structure,
                                    // 36 bytes
    short       sMaxCopyCount;      // max # of copies for
                                    // PC_OCD_
                                    // MULT_COPIES
    WORD        fGeneral;           // General bit flags
    WORD        orgwOrder;
    OCD         rgocd[PC_OCD_MAX];
    } PAGECONTROL, * PPAGECONTROL, FAR *
LPPAGECONTROL;
//------------------------------------------------------------
// Indices into rgocd[] for OCDs
//------------------------------------------------------------
#define PC_OCD_BEGIN_DOC            0
#define PC_OCD_BEGIN_PAGE           1
#define PC_OCD_DUPLEX_ON            2
#define PC_OCD_ENDDOC               3
#define PC_OCD_ENDPAGE              4
#define PC_OCD_DUPLEX_OFF           5
#define PC_OCD_ABORT                6
#define PC_OCD_PORTRAIT             7
#define PC_OCD_LANDSCAPE            8
#define PC_OCD_MULT_COPIES          9
#define PC_OCD_DUPLEX_VERT          10
#define PC_OCD_DUPLEX_HORZ          11
#define PC_OCD_PRN_DIRECTION        12
#define PC_OCD_JOB_SEPARATION       13
#define PC_OCD_MAX                  14
```

| | |
|---|---|
| fGeneral | General purpose bit flags. |
| orgwOrder | Offset in HEAP to null terminated array of WORDs describing the order in which printer commands should be sent at the beginning of a document or beginning of each page. Each of the vaules below refers to printer commnad. This array allows the minidriver to control the order in which commands are sent and to specify a different ordering if needed. Not all of the values listed below need be present, only those referring to commands appropriate to the printer. Note that any commands listed after PC_BEGINPAGE will be sent on a per page basis. |
| PC_ORD_BEGINDOC | Refers to PAGECONTROL. rgocd[PC_OCD_ BEGIN_DOC] |
| PC_ORD_ORIENTATION | Refers to either PAGECONTROL. rgocd[PC_OCD_ PORTRAIT] or PAGECONTROL. rgocd[PC_OCD_ LANDSCAPE], depending upon selected orientation. |

| | |
|---|---|
| PC_ORD_MULT_COPIES | Refers to PAGECONTROL. rgocd[PC_OCD_MULT_COPIES] |
| PC_ORD_DUPLEX | Refers to PAGECONTROL. rgocd[PC_OCD_DUPLEX_ON] |
| PC_ORD_DUPLEX_TYPE | Refers to PAGECONTROL. rgocd[PC_OCD_DUPLEX_HORZ or PAGECONTROL. rgocd[PC_OCD_DUPLEX_VERT], depending upon what the user has requested. |
| PC_ORD_TEXTQUALITY | Refers to TEXTQUALITY. ocdSelect for the currently selected Text Quality. |
| PC_ORD_PAPER_SOURCE | Refers to PAPERSOURCE. ocdSelect for the currently selected Paper Source. |
| PC_ORD_PAPER_SIZE | Refers to PAPERSIZE. ocdSelect for the currently selected Paper Size. |
| PC_ORD_PAPER_DEST | Refers to PAPERDEST. ocdSelect for the currently selected Paper Destination. |
| PC_ORD_RESOLUTION | Refers to RESOLUTION. rgocd[RES_OCD_SELECTRES] for the currently selected graphics resolution. |
| PC_ORD_BEGINPAGE | Refers to PAGECONTROL. rgocd[PC_OCD_BEGIN_PAGE] |
| PC_ORD_MULT_COPIES | Refers to PAGECONTROL. rgocd[PC_OCD_MULT_COPIES] |
| PC_ORD_SET_COLORMODE | Refers to DEVCOLOR. ocdSetColorMode |
| rgocd[] | Array of offsets to Command descriptors in the HEAP section that refer to a various printer commands to control how a page is processed by the device. A more detailed description of each list is provided below. |
| PC_OCD_BEGIN_DOC | Printer commands to initialize the printer at the beginning of each print job. |
| PC_OCD_BEGIN_PAGE | Printer commands to initialize the printer at the beginning of each page. |
| PC_OCD_DUPLEX_ON | Printer command to enable duplexing. |
| PC_OCD_END_DOC | Printer commands to restore the printer to it's initial state at the end of each print job. |
| PC_OCD_END_PAGE | Printer commands to restore the printer to an appropriate state at the end of each page. |
| PC_OCD_DUPLEX_OFF | Printer command to disable duplexing. |
| PC_OCD_ABORT | Printer commands to rest the printer. Used when print job is aborted. |
| PCD_OCD_PORTRAIT | Printer commands to select portrait orientation. |
| PC_OCD_LANDSCAPE | Printer commands to select landscape orientation. |
| PC_OCD_MULIPLE_COPIES | Printer command to cause the printer to print multiple copies of a page. This command requires an EXTCD command descriptor to express the number of copies desired in the format required by the printer. |
| PC_OCD_VERTICAL_DUPLEX | Printer command to request Vertical duplex binding. |
| PC_OCD_HORIZ_DUPLEX | Printer command to request Horizontal duplex binding. |
| PC_OCD_PRN_DIRECTION | Printer command to set direction of text relative to current orientation at 90 degree increments. Note that MODELDATA.fText and/or MODELDATA.fLText TC_CR_90 bit must be set to enable this. |
| PC_JOB_SEPARATION | Print command to activate printers job separation feature. Only used once per print job and is reset by printers reset command. |

13. CURSORMOVE structure

The CURSORMOVE structure contains information on how to move the cursor/current position from one point to another on the page.

```
typedef struct
    {
    short       cbSize;              // size of structure,
                                     // 44 bytes
    short       sReserved;           // so DW aligned
    WORD        fGeneral;            // general bit flags
    WORD        fXMove;              // flags describing X
                                     // movement
                                     // capabilities
    WORD        fYMove;              // flags describing Y
                                     // movement
                                     // capabilities
    OCD         rgocd[CM_OCD_MAX];
    } CURSORMOVE, * PCURSORMOVE, FAR *
LPCURSORMOVE;
#define CM_OCD_XM_ABS         0
#define CM_OCD_XM_REL         1
#define CM_OCD_XM_RELLEFT     2
#define CM_OCD_YM_ABS         3
#define CM_OCD_YM_REL         4
#define CM_OCD_YM_RELUP       5
```

| | | |
|---|---|---|
| #define CM_OCD_YM_LINESPACING | 6 | |
| #define CM_OCD_XY_REL | 7 | |
| #define CM_OCD_XY_ABS | 8 | |
| #define CM_OCD_CR | 9 | |
| #define CM_OCD_LF | 10 | |
| #define CM_OCD_FF | 11 | |
| #define CM_OCD_BS | 12 | |
| #define CM_OCD_UNI_DIR | 13 | |
| #define CM_OCD_UNI_DIR_OFF | 14 | |
| #define CM_OCD_PUSH_POS | 15 | |
| #define CM_OCD_POP_POS | 16 | |
| #define CM_OCD_MAX | 17 | |
| fGeneral | general bit flags | |
| fXMove | flags describing X movement capabilities | |
|    CM_XM_CR | Send CM_OCD_XM_CR before X movement commands. | |
|    CM_XM_FAV_ABS | Favor CM_OCD_XM_ABS over CM_OCD_XM_REL commands. | |
|    CM_XM_REL_LEFT | CM_OCD_XM_REL command can move to left, CM_OCD_XM_RELLEFT not used. | |
|    CM_XM_ABS_NO_LEFT | Printer has no left motion capability. If the cursor must be moved to the left, a Carriage Return is sent and the head repositioned. | |
| fYMove | Flags describing Y movement capabilities | |
|    CM_YM_CR | Send CM_OCD_XM_CR before Y movement commands. | |
|    CM_YM_FAV_ABS | Favor CM_OCD_YM_ABS over CM_OCD_YM_REL commands. | |
|    CM_YM_REL_UP | CM_OCD_YM_REL can move upwards, CM_OCD_YM_RELUP not used. | |
|    CM_YM_SETLINESPACING | Favor CM_OCD_YM_LINESPACING commands. | |
| rgocd[] | Array of offsets to Command descriptors in the HEAP section that refer to various printer commands to control how a page is processed by the device. A more detailed description of each list is provided below. | |
|    CM_OCD_XM_ABS | Printer command to perform absolute X movement. | |
|    CM_OCD_XM_REL | Printer command to perform relative X movement. | |
|    CM_OCD_XM_RELLEFT | Printer command to perform relative left X movement. | |
|    CM_OCD_YM_ABS | Printer command to perform absolute Y movement. | |
|    CM_OCD_YM_REL | Printer command to perform relative Y movement. | |
|    CM_OCD_YM_RELUP | Printer command to perform upward relative Y movement. | |
|    CM_OCD_YM_LINESPACING | Printer command set Y increment value for each subsequent CM_OCD_YM_LF command sent. | |
|    CM_OCD_XY_ABS | Printer command to perform X and Y absolute movement. | |
|    CM_OCD_XY_REL | Printer command to perform X and Y relative movement. | |
|    CM_OCD_CR | Printer command to move cursor to leftmost position on current page. Typically a carriage return (0Dh), but other commands can be used. | |
|    CM_OCD_LF | Printer command to advance cursor to next line on page. The distance moved is controlled by ocdSetLineSpacing. Typically a line feed (0Ah), but other commands can be used. | |
|    CM_OCD_FF | Printer command to eject page from printer. This command is only used if PSRC_EJECTFF bit is set in PAPERSOURCE. fGeneral. Otherwise, it is assumed that cursor position can be moved to the next page by an appropriate combination of Y movement commands. | |
|    CM_OCD_BS | Printer command to backspace a single character width. The printer must move the cursor back the width of the last printed character when sent this command. This command is only used if DI_BKSP_OK bit is set in DRIVERINFO.fCaps of a PFM file and the font uses a CTT_WTYPE_PAIRED character translation table. Please see the section on character translation tables for additional information. | |
|    CM_OCD_UNIDIR_ON | Printer command to enable unidirectional printing. | |
|    CM_OCD_UNIDIR_OFF | Printer command to disable unidirectional printing. | |
|    CM_OCD_PUSH_POS | Printer command to push current position on stack (in printer), the current position may later be returned to via CM_OCD_POP_POS. | |
|    CM_OCD_POP_POS | Printer command to pop previously saved cursor position from stack. | |

14. FONTSIMULATION structure

The FONTSIMULATION structure describes various printer commands to enable and disable various character attributes such as bold, italic, underline, etc.

```
typedef struct
  {
  short     cbSize;              // size is 48 bytes
  short     sReserved;           // so DW aligned
  WORD      fGeneral;
  short     sBoldExtra;
  short     sItalicExtra;
  short     sBoldItalicExtra;
  OCD       rgocd[FS_OCD_ST_MAX];
  } FONTSIMULATION, * PFONTSIMULATION, FAR *
LPFONTSIMULATION;
#define FS_OCD_BOLD_ON                    0
#define FS_OCD_BOLD_OFF                   1
#define FS_OCD_ITALIC_ON                  2
#define FS_OCD_ITALIC_OFF                 3
#define FS_OCD_UNDERLINE_ON               4
#define FS_OCD_UNDERLINE_OFF              5
#define FS_OCD_DOUBLEUNDERLINE_ON         6
#define FS_OCD_DOUBLEUNDERLINE_OFF        7
#define FS_OCD_STRIKETHRU_ON              8
#define FS_OCD_STRIKETHRU_OFF             9
#define FS_OCD_SET_UNDERLINE_POS          10
#define FS_OCD_SET_UNDERLINE_THICKNESS    11
#define FS_OCD_RESERVED1                  12
#define FS_OCD_RESERVED2                  13
#define FS_OCD_RESERVED3                  14
#define FS_OCD_RESERVED4                  15
#define FS_OCD_MAX                        16
```

| | |
|---|---|
| fGeneral | general bit flags |
| sBoldExtra | Describes width added to each character when FS_ST_OCD_BOLD_ON sent. Measured in Master Units. |
| sItalicExtra | Describes width added to each character when FS_ST_OCD_ITALIC_ON sent. Measured in Master Units. |
| sBoldItalicExtra | Describes width added to each character when FS_ST_OCD_BOLD_ON and FS_ST_OCD_ITALIC_ON are sent. Measured in Master Units. |
| rgocd[] | Array of OCDs for simulated font attributes. Below is a description of which attribute each OCD controls, listed by index value. Note that the commands for controlling character spacing are only intended to be used for those printers that have special requirements for movement commands to function correctly (such as not being in Proportional space mode, or having to be in 10 CPI mode). |
| FS_OCD_BOLD_ON | Printer command to embolden subsequent characters. |
| FS_OCD_BOLD_OFF | Printer command to deactivate emboldening characters. |
| FS_OCD_ITALIC_ON | Printer command to italicize subsequent characters. |
| FS_OCD_ITALIC_OFF | Printer command to deactivate italicized characters. |
| FS_OCD_UNDERLINE_ON | Printer command to underline subsequent characters. |
| FS_OCD_UNDERLINE_OFF | Printer command to deactivate underlining of characters. |
| FS_OCD_DOUBLEUNDERLINE_ON | Printer command to double underline subsequent characters. |
| FS_OCD_DOUBLEUNDERLINE_OFF | Printer command to deactivate doubly underlined characters. |
| FS_OCD_STRIKETHRU_ON | Printer command to strike thru subsequent characters. |
| FS_OCD_STRIKETHRU_OFF | Printer command to deactivate strike thru characters. |
| FS_OCD_SET_UNDERLINE_POS | Printer command to specify underline position. |
| FS_OCD_SET_UNDERLINE_THICKNESS | Printer command to specify underline thickness. |

15. DEVCOLOR structure

The DEVCOLOR structure describes the way in which a device handles color for both graphics and text. The DEVCOLOR structure can support devices that process color data either one plane at a time or one pixel at a time. Note that much of this is preliminary, and may be changed as more devices using color come to market.

```
typedef struct
  {
  short     cbSize;              // size of this structure
                                 // (32 bytes)
  WORD      fGeneral;            // general flag bit field
  short     sPlanes;             // # of color planes
                                 // required
  short     sBitsPixel;          // # of bits per pixel (per
                                 // plane). At least 1 of
                                 // sPlanes and sBitsPixel
                                 // is 1
  WORD      orgocdPlanes;        // offset to a list of
                                 // OCD's for sending data
                                 // planes. The # of OCD's
                                 // is equal to sPlanes. This
                                 // field is not used in case
                                 // of pixel color models.
                                 // The first command will
                                 // be used to send data of
                                 // the first plane, and
                                 // so on.
  OCD       rgocdText[8];        // cmds to select 8 text
                                 // colors
  OCD       ocdSetColorMode;     // set color information on
                                 // the printer. This cmd
                                 // decides either plane or
                                 // pixel model and should
                                 // be sent before
                                 // BEGIN_GRAPHICS
  DWORD     wReserved;           // reserved for additional
                                 // escapes when needed.
  } DEVCOLOR, * PDEVCOLOR, FAR * LPDEVCOLOR;
#define DC_TC_BLACK       0
#define DC_TC_RED         1
#define DC_TC_GREEN       2
#define DC_TC_YELLOW      3
#define DC_TC_BLUE        4
#define DC_TC_MAGENTA     5
#define DC_TC_CYAN        6
#define DC_TC_WHITE       7
#define DC_TC_MAX         8
```

| | |
|---|---|
| fGeneral | Bit field describing general information about DEVCOLOR. |
| DC_PRIMARY_RGB | Device uses RGB color model if set, (K)CMY otherwise. This also determines the ordering of plane colors specified at |

|  |  |
|---|---|
|  | orgwPlanesColors. If this is set, order is RGB (Red 1st, etc.). If this is not set, order is (K)CMY, where Black is 1st (if DC_CF_EXTRACT_BLACK) is set, followed by Cyan etc. |
| DC_EXTRACT_BLK | Extract black and send as separate plane if set, otherwise assume black produced by mixing other colors. |
| DC_SEND_CR | send CR before selecting graphics color. Due to limited printer buffer. |
| sPlanes | Count of number of color planes available. If this value is 1, assume that this DEVCOLOR structure describes a 'pixel' color model, otherwise this DEVCOLOR structure describes a color 'plane' model and the value describes the number of color planes supported. |
| sBitsPixel | Count of bits per pixel. Number of color planes available. If this value is 1, assume that this DEVCOLOR structure describes a 'plane' color model, otherwise this DEVCOLOR structure describes a color 'pixel' model and the value must be either 4 or 8, which describes the number of bits or color data per pixel. The color bits (4 or 8) are directly from the Win 3.1 DIB driver. They should be used as index into the printer's color palette. The mini driver writer must make sure that the printer's color palette is configured in the same way as DIB's color palette is via use of the ocdSetColorMode command. If the Win 3.1 DIB driver is unavailable, a 'pixel' DEVCOLOR model will not be used and the Windows generic library will attempt to use a 'plane' color model. |
| orgocdPlanes | Offset in HEAP to null terminated array of OCDs referring to commands for selecting a color plane. The number of OCDs in this array is equal to sPlanes. |
| rgocdText[] | Array of command descriptors to select text color. If a device does not have commands for selecting a particular color (such as White), no commands shoud be entered. |
| ocdSetColorMode | Offset to command descriptor for printer command to select this color model. Only needed for 'pixel' color models. |

16. RECTFILL structure

The RECTFILL structure describes methods and commands to fill a rectangular area.

```
typedef struct
    {
    short       cbSize;              // size of structure,
                                     // 20 bytes
    WORD        fGeneral;            // general bit flags
    WORD        wMinGray;            //
    WORD        wMaxGray;            //
    OCD         rgocd[RF_OCD_MAX];
    } RECTFILL, * PRECTFILL, FAR * LPRECTFILL;
#define RF_OCD_X_SIZE        0
#define RF_OCD_Y_SIZE        1
#define RF_OCD_GRAYFILL      2
#define RF_OCD_WHITEFILL     3
#define RF_OCD_HATCHFILL     4
#define RF_OCD_MAX           5
fGeneral                     general bit flags
```

|  |  |
|---|---|
| RF_WHITE_ABLE | White rule exists. |
| RF_MIN_IS_WHITE | Minimum graylevel is white. |
| RF_CUR_X_END | X position at end of rectangle after rendering. (Default is no change of position) |
| RF_CUR_Y_END | Y position at end of rectangle after rendering. (Default is no change of position). |
| wMinGray | Minimum value for gray level. |
| wMaxGray | Maximum value for gray level. |
| rgocd[] | Array of offsets to Command descriptors in the HEAP section that refer to a various printer commands to control data compression modes. A more detailed description of each list is provided below. |
| RF_OCD_X_SIZE | Offset to Printer command to specify the horizontal size of the rectangle. |
| RF_OCD_Y_SIZE | Offset to Printer command to specify the vertical size of the rectangle. |
| RF_OCD_GRAYFILL | Offset to Printer command to fill a gray rectangle. This command will accept a parameters between wMinGray and wMaxGray to specify the gray level. |
| RF_OCD_WHITEFILL | Offset to Printer command to fill a white rectangle. No parameter is needed. |
| RF_OCD_HATCHFILL | Offset to Printer command to fill a rectangle with a hatch pattern. Version 1.00 of the Windows generic library will not support this abilty. |

17. DOWNLOADINFO structure

The DOWNLOADINF0 structure contains all information needed to download fonts. It contains several bitfields that describe the order in which printer commands must be sent, limitations on how the printer can handle download fonts, and what control codes are available. It also contains references to all of the necessary control codes used in the downloading process.

```
typedef struct
    {
    short       cbSize;              // size of structure,
                                     // 52 bytes
    WORD        wReserved;           // so DW aligned
    WORD        fGeneral;            // general bit flags
    WORD        fFormat;             // describes download
                                     // font format
    short       sIDMin;              // minimum allowable
                                     // font ID value
    short       sIDMax;              // maximum
                                     // allowable font ID
                                     // value
    short       cbBitmapFontDsc;
    short       cbScaleFontDscr;
    short       cbBitmapCharDsc;
    short       cbBitmapCharDsc;
    short       sMaxFontCount;
    WORD        wReserved1;
    OCD         rgocd[DLI_OCD_MAX];  // array of OCDs for
                                     // printer cmds
    } DOWNLOADINFO, * PDOWNLOADINFO, FAR *
LPDOWNLOADINFO;
#define DLI_OCD_RESERVED                    0
#define DLI_OCD_BEGIN_DL_JOB                1
#define DLI_OCD_BEGIN_FONT_DL               2
#define DLI_OCD_SET_FONT_ID                 3
#define DLI_OCD_SEND_FONT_DESCRIPTOR        4
#define DLI_OCD_SELECT_FONT_ID              5
#define DLI_OCD_SEND_CHAR_DESCRIPTOR        6
```

| | | |
|---|---|---|
| #define DLI_OCD_SET_CHAR_CODE | | 7 |
| #define DLI_OCD_END_FONT_DL | | 8 |
| #define DLI_OCD_MAKE_PERM | | 9 |
| #define DLI_OCD_MAKE_TEMP | | 10 |
| #define DLI_OCD_END_DL_JB | | 11 |
| #define DLI_OCD_DEL_FONT | | 12 |
| #define DLI_OCD_DEL_ALL_FONTS | | 13 |
| #define DLI_OCD_MAX | | 14 |
| fGeneral | | A general purpose bitfield. It used to describe downloading limitations and availablity of some commands. |
| | DLI_GEN_CNT | Printer limits the number of download fonts by a fixed number. |
| | DLI_GEN_MEMORY | Printer limits the number of download fonts by available memory. |
| | DLI_GEN_DLJOB | Printer can only download fonts on per print job basis. |
| | DLI_GEN_DLPAGE | Printer can only download fonts on per page basis. Old fonts may be deleted and new ones added at page boundaries. NOTE: If neither DLI_LIM_DLJOB nor DLI_LIM_DLPAGE are set, assume that downloading can occur at any time. |
| | DLI_GEN_PT_IDS | Must specify a font ID value prior to using DLI_OCD_MAKE_ PERM/TEMP. |
| | DLI_GEN_FNTDEL | Command to delete single font supported. |
| | DLI_GEN_ALLFNTDEL | Command to delete all downloaded fonts supported. |
| fFormat | | Describes download font file format. Primarily for HP PCL support of TrueType. |
| | DLI_FMT_PCL | Printer uses HP PCL. |
| | DLI_FMT_INCREMENT | Incremental download recommended. Incremetal download is when an arbitrary collection of characters from the character set may be downloaded. (Example: Only download "t", "h", "e" to print "The" vs. downloading all 255 chars. |
| | DLI_FMT_RES_SPECIFIED | Download header specifies the originally digitized resolution of the font. Required for Intellifont support on the HP LaserJet IV. |
| | DLI_FMT_PCLETTO | Printer supports the PCLETTO format for downloading scalable font outlines. |
| sIDMin | | Minimum allowable font ID value to be used by DLI_OCD_SET_ FONT_ID. |
| sIDMax | | Maximum allowable font ID value to be used by DLI_OCD_SET_ FONT_ID. |
| cbBitmapFontDsc | | Size of Font descriptor data (in bytes) for Bitmapped downloadable fonts. |
| cbScaleFontDsc | | Size of Font descriptor data (in bytes) for Scaleable downloadable fonts. |
| cbBitmapCharDsc | | Size of character descriptor data (in bytes) for Bitmapped downloadable fonts. |
| cbScaleCharDsc | | Size of character descriptor data (in bytes) for Scalable downloadable fonts. |
| sMaxFontCount | | Maximum number of fonts that may downloaded to the printer at any one time. |
| rgocd[] | | Array of offsets to Command descriptors in the HEAP section that refer to a various printer commands to control downloading of fonts. A more detailed description of each command is provided below. |
| | DLI_OCD_BEGIN_DL_JOB | Printer control codes to be sent prior to downloading any fonts or any other download font commands. |
| | DLI_OCD_END_DL_JOB | Printer control codes to be sent after all download fonts and related commands have been completed. |
| | DLI_OCD_BEGIN_FONT_DL | Printer control codes to be sent prior to each individual font download. |
| | DLI_OCD_END_FONT_DL | Printer control codes to be sent after each individual font download. |
| | DLI_OCD_SET_FONT_PERM | Printer control codes to be sent to make an individual font permanent. |
| | DLI_OCD_SET_FONT_TEMP | Printer control codes to be sent to make an individual font temporary. |
| | DLI_OCD_DEL_FONT | Printer control codes to be sent to delete a single temporary font. This command requires that fonts are able to be referenced via the ocdSetFontID command. |
| | DLI_OCD_DEL_ALLFONTS | Printer control codes to be sent to delete all temporary fonts. This command requires that fonts are able to be referenced via the ocdSetFontID command. |
| | DLI_OCD_SET_FONTID | Printer control codes to be sent to designate a font ID value. The printing engine or font installer is responsible for supplying font ID values. |
| | DLI_OCD_SET_FONT_ | Printer control codes to |

| DESCRIPTOR | be sent prior to each font descriptor (only supported for HPPCL). |
| --- | --- |
| DLI_OCD_SET_CHAR_DESCRIPTOR | Printer control codes to be sent prior to each character descriptor (only supported for HPPCL). |
| DLI_OCD_SET_CHAR_CODE | Printer control codes to be sent to designate an ASCII character value (only supported for HPPCL). |

18. HEAP section

The HEAP section contains all of the printer control/escape codes, lists of indices, and other variable sized data that is referenced from other structures in the table file. The location of the HEAP section is referenced from DATAHDR.1oHeap. Each printer control/escape code is stored in a Command Desciptor (CD) in the format described in the following section. Multiple structures may refer to the same command descriptor if appropriate.

a) CD (Command Descriptor) structure

The Command Descriptor structure is used to describe each printer command referenced from other structures in the table. It can be expressed in 2 formats, a simple command descriptor consists of a CD structure containing the length and content of a printer control/escape code. An extended command descriptor has the same format as a simple, but is followed by one or more EXTCD structure(s) to contain information on how to calculate values for parameters referenced in the command string. The EXTCD structure contains information on what units each parameter should be calculated in, and maximum and minimum allowable values. The format that the parameter is sent to the printer in is determined by the command marker in the command string (rgchCmd). If a command has multiple parameters that have identical EXTCD structures, a single EXTCD structure can be used to apply all parameters. While the file format may allow it, the Windows Generic library requires that either EXTCD.sUnit or EXTCD.sUnitMult may be used individually, but both may not be used in the same EXTCD structure.

```
typedef struct
    {
    WORD     fType;          // type of command
    short    sCount;         // count of EXTCD structs that
                             // follow
    WORD     wLength;        // length of the command
    char     rgchCmd[2];     // Actual Command String,
                             // variable length
    } CD, *PCD, FAR * LPCD;
// for cd.wtype field
#define CMD_FTYPE_EXTENDED       0x0001
#define CMD_FTYPE_RESERVED1      0x2000
#define CMD_FTYPE_RESERVED2      0x4000
#define CMD_FTYPE_CALLBACK       0x8000
#define CMD_MARKER               '%'
//-----------------------------------------------------
// EXTCD — Extended portion of the Command Descriptor.
// This structure follows rgchCmd[] if cd.wType is 1.
//-----------------------------------------------------
typedef struct
    {
    short    fMode;          // Modes, special command
                             // formats.
    short    sUnit;          // Units relative to master units
                             // (divide by)
    short    sUnitMult;      // Units to multiply master units
                             // by, 1 usually
    short    sUnitAdd;       // Units to add to parameter value,
                             // usually 0
    short    sPreAdd;        // Units to add to master units
                             // prior to multiplication
    short    sMax;           // Maximum parameter allowed in
                             // command units.
    short    sMin;           // Minimum parameter allowed in
                             // command units.
    } EXTCD, *PEXTCD, FAR * LPEXTCD;
#define CMD_FMODE_SETMODE        0x0002
```

| fType | type of command |
| --- | --- |
| CMD_FTYPE_EXTENDED | Command structure has sCount EXTCD structures that follow. |
| CMD_FTYPE_RESOURCE | No string at rgchCmd (wLength=0), but sCount is resource number of text file to be sent when this command is requested. |
| CMD_FTYPE_RESERVED1 | reserved |
| CMD_FTYPE_RESERVED2 | reserved |
| CMD_FTYPE_CALLBACK | Callback bit for all commands. If this bit is set then the minidriver is called back to send a command to the printer. This function must be declared with C calling convention because the number of parameters varies according to the command. The following function declaration should be used: short FAR cdecl WriteChannel(lpdv, cmd, . . .) LPDV lpdv; short cmd; // command id, the list of values will be published later. |
| sCount | Count of EXTCD structs that follow rgchCmd[]. |
| wLength | Length of the command string rgchCmd[]. |
| rgchCmd[] | Actual Command String, variable length |
| fMode | Modes, special command formats. |
| CMD_FMODE_SETMODE | This command changes the state of the printer for subsequent commands. |
| sUnit | Units used to express the parameter(s) for this command relative to master units, divide master units by this (ignored if 0). |
| sUnitMult | Units used to express the parameter(s) for this command relative to master units, multiply master units by this, 1 usually (ignored if 0). |
| sUnitAdd | Units to add to the parameter value after performing the sUnit and sUnitMult operations, usually 0. |
| sPreAdd | Units to add to master units before multiplying sUnitMult. |
| sMax | Maximum parameter value allowed in command units (i.e., after performing all the above calculations). |
| sMin | Minimum parameter value allowed in command units (i.e., after performing all of the above calculations). | b) Parameter formats

The format that should be used to express a parameter to a printer is determined by the type of command marker found in the CD.rgchCmd[ ] string. These markers are stored in 'C' style formatted strings. The format characters are preceded by '%'. The predefined formats are as follows:

d: Parameter as ASCII decimal number.

s: Parameter as signed ASCII decimal number.

c: Parameter as byte.

l: Parameter as word, LSB first m: Parameter as word, MSB first.

h: Hexadecimal ASCII number.

o: Octal ASCII number.

q: Qume hexidecimal ASCII number. (common on Toshiba/Qume devices) [others to have support added as appropriate]

Note: To have a '%' (ASCII 37) sent to the printer, use a '%%' in the format string.

19. Calculating printable regions

Determining the exact printable region on a given page may be influenced by many factors. Physical attributes of the printer itself, the paper size, and the paper source/feed method may all impact the size and behavior of the printable region. The following algorithm should be used when attempting to determine the size of the printable region.

The printable region should be calculated by taking the X and Y page dimensions from PAPERSIZE.sSize.x and PAPERSIZE.sSize.y, and subtracting the top, bottom, left, and right values from PAPERSIZE.rect from the appropriate sides. If PAPERSIZE.rect.left is less than MODELDATA. sLeftMargin, MODELDATA. sLeftMargin should be used in place of PAPERSIZE.rect.left. If the remaining printable area (PAPERSIZE.ptSize.x—the currently calculated left and right margins) is larger than MODELDATA.ptMax.x (maximum printable area), the difference between these two values needs to be split and used as unprintable left and right margins (Note that this should only occur when the end user has requested a user defined paper size). If PAPERSIZE.f-General has the PS_CENTER bit set, the difference should be divided evenly, otherwise it is assumed to entirely describe the right unprintable region.

For user defined PAPERSIZEs, the User Interface should allow any paper size ranging between MODELDATA.sMin.x and MODELDATA.sMin.y for the smallest allowable paper size, and MODELDATA.sMaxPhysWidth and MODELDATA.sMax.y for the largest allowable page size. The printable region should be calculated by the same algorithm described above.

II. FONT FILE FORMATS

All of the font metric information is represented in the .PFM file format documented in the Windows SDK, with a DRIVERINFO structure defined for use with the Windows Universal Printer driver library. The basic structures from .PFM files are listed here, descriptive information can be found in the Windows SDK, which is hereby incorporated by reference. The DRIVERINFO and DOWNLOADDATA structures are described at the end of this section. The following information is taken from pfm.h.

1. Standard Font Structures

The following are standard Windows font metric and information structures. Detailed descriptions of these may be found in the Windows SDK.

```
typedef struct
{
    PPFMHEADER        pPfmHeader;
    short *           pCharWidths;
    PPFMEXTENSION     pPfmExtension;
    PEXTTEXTMETRIC    pExtTextMetrics;
    short *           pExtentTable;
    PDRIVERINFO       pDriverInfo;
    PKERNPAIR         pKernPair;
    PKERNTRACK        pKernTrack;
} PFMDATA;
typedef struct {
    short             dfType;
    short             dfPoints;
    short             dfVertRes;
    short             dfHorizRes;
    short             dfAscent;
    short             dfInternalLeading;
    short             dfExternalLeading;
    BYTE              dfItalic;
    BYTE              dfUnderline;
    BYTE              dfStrikeOut;
    short             dfWeight;
    BYTE              dfCharSet;
    short             dfPixWidth;
    short             dfPixHeight;
    BYTE              dfPitchAndFamily;
    short             dfAvgWidth;
    short             dfMaxWidth;
    BYTE              dfFirstChar;
    BYTE              dfLastChar;
    BYTE              dfDefaultChar;
    BYTE              dfBreakChar;
    short             dfWidthBytes;
    DWORD             dfDevice;
    DWORD             dfFace;
    DWORD             dfBitsPointer;
    DWORD             dfBitsOffset;
    BYTE              dfReservedByte;
} PFMHEADER, * PPFMHEADER, far * LPPFMHEADER;
typedef struct
{
    WORD              dfSizeFields;
    DWORD             dfExtMetricsOffset;
    DWORD             dfExtentTable;
    DWORD             dfOriginTable;
    DWORD             dfPairKernTable;
    DWORD             dfTrackKernTable;
    DWORD             dfDriverInfo;
    DWORD             dfReserved;
} PFMEXTENSION, * PPFMEXTENSION, far *
LPPFMEXTENSION;
typedef struct
{
    short             emSize;
    short             emPointSize;
    short             emOrientation;
    short             emMasterHeight;
    short             emMinScale;
    short             emMaxScale;
    short             emMasterUnits;
    short             emCapHeight;
    short             emXHeight;
    short             emLowerCaseAscent;
    short             emLowerCaseDescent;
    short             emSlant;
    short             emSuperScript;
    short             emSubScript;
    short             emSuperScriptSize;
    short             emSubScriptSize;
    short             emUnderlineOffset;
    short             emUnderlineWidth;
    short             emDoubleUpperUnderlineOffset;
    short             emDoubleLowerUnderlineOffset;
    short             emDoubleUpperUnderlineWidth;
    short             emDoubleLowerUnderlineWidth;
    short             emStrikeOutOffset;
```

```
    short       emStrikeOutWidth;
    WORD        emKernPairs;
    WORD        emKernTracks;
} EXTTEXTMETRIC, * PEXTTEXTMETRIC, far *
LPEXTTEXTMETRIC;
typedef struct
    {
    union   {
            BYTE each[2];
            WORD both;
            } kpPair;
    short   kpKernAmount;
    } KERNPAIR, * PKERNPAIR, far * LPKERNPAIR;
typedef struct
    {
    short ktDegree;
    short ktMinSize;
    short ktMinAmount;
    short ktMaxSize;
    short ktMaxAmount;
    } KERNTRACK, * PKERNTRACK, far *
LPKERNTRACK;
```

2. DRIVERINFO structure

The following structure is used by all PFM files that are used by drivers supported by the Windows Universal Printer driver library.

```
typedef struct
    {
    short   sSize;              // size of this structure
    short   iVersion;           // version number
    WORD    fCaps;              // Bit fields describing
                                // capabilities
    short   iFontID;            // unique font id defined by the
                                // driver
    short   sYAdjust;           // adjust y position before output
                                // character used by double
                                // height characters
    short   sYMoved;            // cursor has moved after
                                // printing this font
    short   iTransTab;          // index to translation table
                                // resource
    short   sUnderlinePos;
    short   sDoubleUnderlinePos;
    short   sStrikeThruPos;
    LOCD    locdSelect;         // long offset to command
                                // descriptor
    LOCD    locdUnSelect;       // long offset to command
                                // descriptor to unselect
    WORD    wPrivateData;       // Private data to be used by
                                // mindriver
    short   sShift;             // # pixel to shift each char by
    } DRIVERINFO, * PDRIVERINFO, far *
LPDRIVERINFO;
```

| | |
|---|---|
| sSize | Size of this structure |
| iVersion | Version number of this structure. |
| fCaps | Bit flags describing capabilities. |
|   DF_NOITALIC | This font cannot be italicized using FONTSIMULATION. |
|   DF_NOUNDER | This font cannot be underlined using FONTSIMULATION. |
|   DF_XM_CR | Send CR after using this font. |
|   DF_NOBOLD | This font cannot be bolded using FONTSIMULATION. |
|   DF_NO2UNDERLINE | This font cannot produce double underlines using FONTSIMULATION. |
|   DF_NOSTRIKETHRU | This font cannot be struck-thru using FONTSIMULATION. |
|   DF_BKSP_OK | If this fonts uses a CTT_WTYPE_PAIRED character translation table, this flag is used to determine how to overstrike characters. If it is set, it is assumed that a single backspace character can be used to move the cursor to the start of the bounding box of the previous character prior to overstriking. If it is not set, it is assumed that explicit X movement commands are required to position the cursor for an overstrike. If this font does not use a CTT_WTYPE_PAIRED translation table, this flag is ignored. |
| sYAdjust | Distance to move current Y position, as expressed in master units, before printing characters in this font/size for baseline to align correctly. Primarily used for double height characters. |
| sYMoved | Distance to move Y position, as expressed in master units, after printing with this font/size. Used to compensate for fonts that do not restore the cursor to the correct Y position. Primarily used for double high characters. |
| iTransTab | Index to character translation table resource for this font. This may zero, a positive or negative number. If this is 0, use the character translation table referred to from MODELDATA for this model. If this is a negative number, UNIDRV will take the absolute value and use it's own character translation table resource with this ID. See the section on Character Translation Tables for a description of the predefined character translation tables supported by UNIDRV. If this is a positive value, UNIDRV will use the driver-defined character translation table resource with this ID value. |
| iFontID | Reserved for use to track font resources. Must be 0 in mini-driver. |
| sUnderlinePos | Describes position of hardware underline created by FS_OCD_ST_UNDERLINE_ON command from bottom of the character bounding box measured in Master Units. |
| sDoubleUnderlinePos | Describes position of hardware double underline created by FS_OCD_ST_DOUBLEUNDERLINE_ON command from bottom of the character bounding box measured in Master Units. |
| sStrikeThruPos | Describes position of hardware strike thru created by FS_OCD_ST_STRIKETHRU command from bottom of the character bounding box measured in Master Units. |
| locdSelect | Long offset to command descriptor to select this font. |
| locdUnSelect | Long offset to command descriptor to unselect this font, NOOCD if not used. |
| wPrivateData | Private data to be used by minidriver. |
| sShift | Number of pixel to shift each character to the left or right by. Negative numbers shift to the right, positive number shift to the left. |

III. CHARACTER TRANSLATION TABLE FILE FORMATS

1. Background

A character translation table is used by the Windows Universal Printer driver library to remap characters from the printers native character/symbol set to the Windows ANSI set. The Windows Universal Printer driver library will provide support for some of the common code pages/symbol sets, so that this data will not need to be propagated redundantly in a large number of individual printer drivers. It is intended that printer drivers supporting devices with less common code pages/symbol sets will contain their own character translation table resources. Any given driver can mix and match either of these types of character translation tables as needed. Character translation tables provided by the Universal driver are referenced from the mini driver by negative numbers corresponding the resource ID values (from the Universal Driver), and character translation tables provided by the mini driver are referenced by positive numbers corresponding to the resource ID values (from the mini driver).

2. Predefined Translation Tables

As previously stated, the Windows Universal Printer driver library will provide support for some of the common code pages/symbol sets, and allow drivers to support less common ones. The list of character translation tables currently supported by the Windows Universal Printer driver library is as follows:

| #define CTT_CP437 | −1 \\IBM Code Page 437. |
|---|---|
| #define CTT_CP850 | −2 \\IBM Code Page 850. |

3. TRANSTAB structure

There are 3 formats of character translation tables available for use. The first is a single byte-to-byte translation used for simple remappings. The second is a single byte-to-two bytes translation, where the second character is used to overstrike the first. The DI_BKSP_OK flag determines how the cursor should be repositioned to overstrike the second character on the first. The third allows a single byte-to-variable length string that may contain commands to change symbol sets, or whatever else is necessary, to create the desired character. Any printer commands sent from here cannot change the permanent state of the printer.

```
typedef struct
    {
    WORD    wType;          // tells what type of translation
                            // table
    BYTE    chFirstChar;
    BYTE    chLastChar;
    union
        {
        short   PsCode[1];
        BYTE    bCode[1];
        BYTE    bPairs[2][1];
        } uCode;
    } TRANSTAB, FAR * LPTRANSTAB;
// Defined indices for wType
```

| wType | tells what type of translation table |
|---|---|
| CTT_WTYPE_COMPOSE | uCode is an array of 16-bit offsets from the beginning of the file pointing to the strings to use for translation. The length of the translated string is the difference between the next offset and the current offset. Please note that an additonal offset is needed (dfLastChar + 1) to provide a means to read the length of the lstring for the translation of the last character. |
| CTT_WTYPE_DIRECT | uCode is a byte array of one-to-one translation table from chFirstChar to chLastChar |
| CTT_WTYPE_PAIRED | uCode contains an array of paired unsigned bytes. If only one character is needed to do the translation then the second byte is zero, otherwise the second byte is struck over the first byte. |
| chFirstChar | First character in character translation table. |
| chLastChar | Last character in character translation table. |

IV. STRUCTURE LISTINGS

The following structures are referenced from other structures described above.

```
typedef struct tagPOINT
    {
    int x;
    int y;
    } POINT;
typedef POINT                           *PPOINT;
typedef POINT NEAR                      *NPPOINT;
typedef POINT FAR                       *LPPOINT;
typedef struct tagRECT
    {
    int left;
    int top;
    int right;
    int bottom;
    } RECT;
#endif
typedef RECT                            *PRECT;
typedef RECT NEAR                       *NPRECT;
typedef RECT FAR         *LPRECT;
```

V. CALLBACK FUNCTIONS

Two callback functions are defined which deal with the RESOLUTION structure.

1. RESOLUTION.fDump

By setting the RES_DM_CALLBACK bit flag in RESOLUTION.fDump, the minidriver will have the ability to assume responsibilities for implementing the Dump function. This function controls rendering raster data from an internal GDI format to a hardware specific format.

2. RESOLUTION.fBlockOut

By setting the RES_BO_CALLBACK bit flag in RESOLUTION.fBlockOut, the minidriver will have the ability to assume responsibilities for implementing the BlockOut function. This function controls how raster data will be sent to the output device.

The RES_BO_CB_FILTER_GRX bit flag in RESOLUTION.fBlockOut allows the minidriver to alter the format of raster graphic data before sending to the output device. This is typically useful if a specific device addresses pins on the printhead in an unusual way (such as older Okidata dot matrix printers for example), or other unusual ways the device requires raster graphic data (such as the "24 raster bits in 4 bytes" format common amongst Toshiba dot matrix printers).

To implement RES_BO_CB_FILTER_GRX in a minidriver, the following steps are necessary:

1) Set the RES_BO_CB_FILTER_GRX bit flag in RESOLUTION.fBlockOut for all RESOLUTION structures implementing this ability.

2) Export "CBFilterGraphics" as ordinal 300 in the EXPORTS section of the definition (.DEF) file for your minidriver.

3) Import "WriteSpoolBuf" as ordinal 300 in the IMPORTS section of the definition (.DEF) file for your minidriver.

4) In the <drvname>.c file for your minidriver, you will need to add the function to perform the changes upon the raster data needed by the device. This function will need to be defined as follows:

short FAR PASCAL CBFilterGraphics(LPBYTE lpdv, LPSTR lpBuf, WORD len)

lpdv Far pointer to private data used by the Universal driver, Your function should not change this data, but will need it when calling WriteSpoolBuf to return the raster data you have altered to the Universal driver.

lpBuf Far pointer to buffer holding raster graphic data. Amount of data in buffer described by len value.

len WORD describing amount of raster data (in bytes) at lpBuf.

Return Value: The total count of bytes of raster data after your function has processed the raster data. This may be the same as the 'len' value passed in, but not necessarily so.

After CBFilterGraphics has finished with changes the raster graphic data, it should call the function described below to provide the data to the Universal driver. Please note that you will have to prototype this function in your <drvname>.c file to satisfy the compiler.

short FAR PASCAL WriteSpoolBuf(LPBYTE lpdv, LPSTR lpNewBuf, WORD newlen);

lpdv Far pointer to private data used by the Universal driver, this should be identical to what was passed in.

lpNewBuf Far pointer to buffer holding changed raster graphic data. Amount of data in buffer described by newlen value.

newlen WORD describing amount of raster data (in bytes) at lpNewBuf.

VI. SCALABLE DEVICE FONTS

Scalable font width are specified in the EXTENTTABLE of a PFM file, details as described in the Windows 3.1 DDK Printers and Fonts Manual, which is hereby incorporated by reference. Note that for internal scalable font PFM files (i.e., those compiled with the driver), all values in PFMHEADER must be expressed in device units as defined by the values dfHorizRes and dfVertRes, and dfHeight must be non-zero. For external scalable PFM files (i.e., those installed via the font installer), the format used by the HPPCL5A driver is preferably supported for compatibility.

DEVICE DATA STRUCTURE DETAILS

Table 1 is a C language listing of definitions of the device data structure and supporting structures. Table 2 is a C language listing of definition of entries into a command description table.

```
        #define CCHMAXCMDLEN   128        // maximum comamnd length
        #define CCHMAXBUF      128        // size of local buffer
        #define CCHSPOOL       512        // size of spool buffer
        #define CCHLOCALHEAP   2048       // size of local heap for local memory
5       #define CCHPQHEAP      6144       // size of heap for TOS priority queue
        #define CCHHEAPGROW    512        // increment amt for the local heap
        #define CMAXPOINT      128        // number of temp points for output.c
        #define CPQENTRY       16         // number of priority queue entries
        #define CFONTENTRY     16         // number of fonts to log
10      #define MAXBANDSIZE    0x8000
        #define MINBANDSIZE    0x4000
        #define XBUF           5          // need memory 5 times string length to
                                          // process a string in ExtTextOut 15      // dib signature
        #define DIBSIGNATURE   0x4944
        //#define BM_DEVICE    0x1        // our physical device
        #define BM_DEVICE      0x8080

20      typedef short     FAR *LPSHORT;

#define IsWhite(rgb)      (((rgb) & 0xffffff) == 0xffffff)
        // want to match GDI/Display's black/white cutoff intensity
        #define CloseToWhite(rgb) (((5*GetGValue(rgb)+3*GetRValue(rgb)+GetBValue(rgb)+4)>>3) > 128)
25
        #define NotWhite(rgb)     (((rgb) & 0xffffff) != 0xffffff)
        #define IsBlack(rgb)      ((rgb) == 0)

#define INTENSITY(r,g,b)  (BYTE)(((WORD)((r) << 2) + (r) + (WORD)((g) << 3) + (g) + (WORD)((b)
30      << 1)) >> 4)

typedef struct{
            WORD   fMode;
            DWORD  bkColor;
35          DWORD  TextColor;
            // actual display brush follows;
            } PBRUSH, FAR * LPPBRUSH;
        // fMode
        #define DITHERBRUSH    1
40
        //------------------------------------------------------------------------//
        // Declarations for OEM Brute Routines and TrueType functions
        //------------------------------------------------------------------------//

45      typedef short   (FAR PASCAL *LPFNGETRASTERIZERCAPS)(LPRASTERIZER_STATUS, int);
        typedef short   (FAR PASCAL *LPDMBitBlt)(LPBITMAP, short, short, LPBITMAP, short, short,
                                    short, short, long, long, LPDRAWMODE);
        typedef short   (FAR PASCAL *LPDMPixel)(LPBITMAP, short, short, long, long);
        typedef short   (FAR PASCAL *LPDMOutput)(LPBITMAP, WORD, WORD, LPPOINT,
50                                  LPVOID, LPPBRUSH, LPDRAWMODE, LPRECT);
        typedef long    (FAR PASCAL *LPDMStrBlt)(LPBITMAP, short, short, LPRECT, LPSTR, short,
                                    LPFONTINFO, LPDRAWMODE, LPTEXTXFORM);
        typedef short   (FAR PASCAL *LPDMScanLR)(LPBITMAP, short, short, long, short);
        typedef short   (FAR PASCAL *LPDMEnumObj)(LPBITMAP, short, long, long);
55      typedef long    (FAR PASCAL *LPDMColorInfo)(LPBITMAP, long, LPLONG);
        typedef short   (FAR PASCAL *LPDMRealizeObject)(LPBITMAP, short, LPSTR, LPSTR, LPTEXTXFORM);
        typedef short   (FAR PASCAL *LPDMEnumDFonts)(LPBITMAP, LPSTR, FARPROC, long);
        typedef short   (FAR PASCAL *LPDMEnable)(LPGDIINFO, WORD, LPSTR, LPSTR, LPDM);
        typedef short   (FAR PASCAL *LPDMDisable)(LPBITMAP);
60      typedef long    (FAR PASCAL *LPDMExtTextOut)(LPBITMAP, short, short, LPRECT, LPSTR, short,
                                    LPFONTINFO, LPDRAWMODE, LPTEXTXFORM, LPSHORT,
                                    LPRECT, WORD);
        typedef short   (FAR PASCAL *LPDMGetCharWidth)(LPBITMAP, LPSHORT, BYTE, BYTE, LPFONTINFO,
                                    LPDRAWMODE, LPTEXTXFORM);
65      // this definition for StretchBlt is wrong...
        typedef int (FAR PASCAL *LPDMStretchBlt)(LPBITMAP, WORD, WORD, WORD, WORD, WORD,
                        WORD, WORD, WORD, WORD, LPSTR, LPBITMAPINFOHEADER,
                        LPSTR, DWORD, LPSTR, LPDRAWMODE, LPRECT);

70      typedef short   (FAR PASCAL *LPDMDIBBits)(LPBITMAP, short, short, short, LPSTR,
                                    LPBITMAPINFOHEADER, LPDRAWMODE, LPSTR);
        typedef short   (FAR PASCAL *LPDMCreateDIBitmap)();
```

```
       typedef int   (FAR PASCAL *LPDMStretchDIB)(LPBITMAP, WORD, WORD, WORD, WORD, WORD,
                            WORD, WORD, WORD, WORD, LPSTR, LPBITMAPINFOHEADER,
                            LPSTR, DWORD, LPSTR, LPDRAWMODE, LPRECT);
       typedef short (FAR PASCAL *LPDMSetDIBToDev)(LPBITMAP, short, short, short, short, LPRECT,
 5                                LPDRAWMODE, LPSTR, LPBITMAPINFOHEADER, LPSTR);
       typedef short (FAR PASCAL *LPDMGetDIBCaps)(short);
       typedef DWORD (FAR PASCAL *LPDMGetAppCompatFlags)(WORD);
       typedef BOOL  (FAR PASCAL *LPDMDeleteSpoolPage)(HANDLE);

10     typedef struct
       {
           LPDMBitBlt          lpBitBlt;
           LPDMColorInfo       lpColorInfo;
           FARPROC             lpControl;        // dummy, place holder
15         LPDMDisable         lpDisable;
           LPDMEnable          lpEnable;
           LPDMEnumDFonts      lpEnumDFonts;
           LPDMEnumObj         lpEnumObj;
           LPDMOutput          lpOutput;
20         LPDMPixel           lpPixel;
           LPDMRealizeObject   lpRealizeObject;
           LPDMStrBlt          lpStrBlt;
           LPDMScanLR          lpScanLR;
           LPDMExtTextOut      lpExtTextOut;
25         LPDMGetCharWidth    lpGetCharWidth;
           LPDMStretchBlt      lpStretchBlt;
           LPDMDIBBits         lpDIBBits;
           LPDMStretchDIB      lpStretchDIB;
           LPDMSetDIBToDev     lpSetDIBToDev;
30     } FNBRUTE, FAR * LPFNBRUTE;

/*--------------- must be inserted into the LPDV cause you can't have
                 forward reference to LPDV
35
       typedef short (FAR PASCAL *LPFNOEMGrxFilter)(LPDV, LPSTR, WORD);
       typedef short (FAR PASCAL *LPFNOEMBlockOut)(LPDV, short, short, LPSTR, short,
                        short);
       typedef short (FAR PASCAL *LPFNOEMDump)(LPDV, LPPOINT, WORD);
40
       typedef struct
       {
           LPFNOEMGrxFilter        fnOEMGrxFilter;
           LPFNOEMBlockOut         fnOEMBlockOut;
45         LPFNOEMDump             fnOEMDump;
       }FNCALLBACK, FAR * LPFNCALLBACK;
       ------------------*/

//----------------------------------------------------------------//
50     // Ordinal numbers for OEM and TRUETYPE ROUTINES
       //----------------------------------------------------------------// define ORDINAL_BITBLT          1
           #define ORDINAL_COLORINFO       2
55         #define ORDINAL_CONTROL         3
           #define ORDINAL_DISABLE         4
           #define ORDINAL_ENABLE          5
           #define ORDINAL_ENUMDFONTS      6
           #define ORDINAL_ENUMOBJ         7
60         #define ORDINAL_OUTPUT          8
           #define ORDINAL_PIXEL           9
           #define ORDINAL_REALIZEOBJECT   10
           #define ORDINAL_STRBLT          11
           #define ORDINAL_SCANLR          12
65         #define MAX_BRUTE               12

//----------------------------------------------------------------//
       // PAPERFORMAT contains size information in test units for the
       //             selected paper.
70     //----------------------------------------------------------------// typedef struct
```

```
{
    POINT       ptPhys;         // physical paper size (in text resolution units)
    POINT       ptRes;          // printable area (in text resolution units)
                                // NOTE: any position within the printable area
                                // should be addressable AND upon which the printer
                                // should be able to place a dot.
    POINT       ptMargin;       // top & left unprintable margin (in text units)
    POINT       ptPrintOrig;    // offset of the printable origin relative to
                                // cursor position (0,0) (in master units).
                                // NOTE: all coordinates from/to GDI
                                // are relative to the printable origin.
    short       sPaperSrcID;    // current paper bin
} PAPERFORMAT, FAR * LPPF;

//------------------------------------------------------------------//
// BANDINFO contains band size information in device units for the  //
//          selected paper.                                         //
//------------------------------------------------------------------//
typedef struct
{
    short       sBandWidth;     // width of the band (in pixels)
    short       sBandHeight;    // number of scanlines (per color) in each band
    WORD        wBlockLen;      // number of bytes in one sub-band
    short       sMaxBand;       // total number of bands
    BOOL        bForceTextBand; // enforce a separate text band?
} BANDFORMAT, FAR * LPBF;

#define TT_FONT     0           // true-type font
#define RES_FONT    1           // internal font (part of mini driver resource)
#define CART_FONT   2           // HP/PCL format external cartridge font
define SOFT_FONT   3           // HP/PCL format soft font //
// FONTMAP struct: increment FONT_SUM_VERSION in "fonts.h" whenever modifying
// this structure.
typedef struct
{
    int         iFontType;      // type of this font (1, 2, or 3)
    short       rcID;           // resource ID of an internal font
    union
    {
        struct
        {
            ATOM    aPCMFileName;   // atomized cartridge file name
            DWORD   dwPFMOffset;    // offset (from head) to the font's PFM
        } CartFont;
        struct
        {
            ATOM    aPFMFileName;   // atomized font's PFM file name
            ATOM    aDLFileName;    // atomized download file name of the font
            WORD    idDown;         // soft font download id #
            WORD    wMem16;         // required printer memory (in 16 bytes).
        } SoftFont;
    } u;
    OCD         oSelect;        // OCD to select/unselect this font
    OCD         oUnSelect;
    ATOM        aFaceName;      // atomized font face name.
    short       sFontSize;      // size of font information structure
    BOOL        bScalable;      // TRUE if this font is scalable.
    TEXTMETRIC  tm;
    BYTE        bAddBold;       // must use a byte to make FONTMAP word-
                                // aligned --- TEXTMETRIC length is ODD !!!
    // 'bAddBold' is used only by DeskJet algorithmic enboldening of
    // fonts. It stores how much to add to the width of each char in
    // the font, one of (0, 1, 2, 3). It's initialized to zero.
} FONTMAP, FAR * LPFONTMAP;

//------------------------------------------------------------------//
// OUTPUTCTL is included in PDEVICE for controlling the state of the output
```

```
// device during banding
//--------------------------------------------------------------// typedef struct
{
    HANDLE      hJob;              // spooling job handle
    short       status;            // spooling job status
//  short       iJob;              // the nth job for this lpdv
    short       sBand;             // band count (current band #, start at 1)
                                   // if sBand = 0, return the coordinates of
                                   // the first band in the new page.
    short       iPage;             // page count (current page #, starting at 1)
    short       sBytesPerNPins;    // number of bytes per row of rendering bitmap;
    short       sBytesPerPinPass;  // number of bytes per row of printhead.

POINT       ptOffset;          // offset of the current graphics band relative
                                   // to the printable origin (in graphics units).
    POINT       ptCursor;          // current cursor position (i.e. printer's CAP)
                                   // (in master units)

BOOL        bOldPaintBrush;    // this get set if query dev capab is called
                                   // with SETDIBSCALING as the capab
    WORD        fCtlMode;          // graphic mode and compression flags short       sXerr;             // round off err for X
    short       sECtl;             // last command number sent
    short       sFont;             // last font selected
    short       sFontHeight;       // height of the last font selected
                                   // (used only by scalable fonts)
    short       sExtraBreakSize;   // width of current space in master units
    short       sExtraCharSize;    // extra pixel in master units
    short       sWeight;           // last weight chosen
    short       sText;             // last font selected
    short       sColor;            // last color chosen
    short       sLineSpacing;      // last line spacing chosen BOOL        bTTBitmapForced;   // flag if all TT fonts are turned to
                                   // bitmaps on this page.

} OUTPUTCTL, FAR * LPCTL;

// flags for fCtlMode define CF_EXIT_BEFORE_X_MOV  0x0001  // set this flag in ldump if X or Y moves
define CF_EXIT_BEFORE_Y_MOV  0x0002  // are disabled in raster graphics mode
#define CF_GRAPHICS_MODE      0x0004  // is the printer in graphics mode?

#define CF_CMP                0x00F0  // compression bits
#define CF_CMP_NONE           0x0010  // no compression (in graphics mode)
#define CF_CMP_RLE            0x0020  // RLE compression (")
#define CF_CMP_TIFF           0x0040  // TIFF compression (")
#define CF_CMP_DELTAROW       0x0080  // Delta Row compression (")

// keep track of fonts used on a page typedef struct
{
    WORD        iUsed;             // # of fonts used on the current page
    WORD        sPrinterMax;       // max # of fonts allowed per page
    short       sEntry;            // Number of entries we have allocated.
    HANDLE      hEntry;            // list of font id's used on current page
    LPSHORT     lpEntry;           // GlobalLock(hFontsUsed);
} FONTCOUNT, FAR * LPFONTCOUNT;

typedef struct
{
    DWORD       dwPhysMem;         // total amount of memory (in bytes)
                                   // available on the printer (excluding
                                   // that taken by permanent soft fonts).
    DWORD       dwFontMem;         // memory used by soft fonts so far (bytes)
    DWORD       dwGrxMem;          // memory used by graphics data (bytes)
                                   // on this page (applicable only on page
                                   // printers).
```

```
        // (dwFontMem + dwGrxMem) is the total amount of printer memory used.
    #if 0
        short       sMemRatio;          // percentage of memory use before reclaim
    #else
        DWORD       dwMinMem;           // threshold (bytes) for resetting printer
    #endif
        HANDLE      hTTFontInfo;        // FontInfo cache
        TEXTXFORM   txTTFont;           // cache TextxForm of the tt font
        BYTE        bFillByte;          // TEXTXFORM is NOT word-aligned!
        LPFONTINFO  lpTTFontInfo;       // GlobalLock(lpdv->hTTFontInfo)
        short       idTTGen;            // id generator
    //  HANDLE      hTTFonts;           // handle to get ttfontinfo from font face.
        short       cbBitmapFontDsc;    // download info
        short       cbBitmapCharDsc;    // download info
        // following fields are used for conventional soft fonts
        WORD        sMaxDownFonts;      // max # of download fonts allowed per job
        short       sNumDownFonts;      // # of slots used in hDownFontList
        short       sNumAlreadyDown;    // # of currently downloaded soft fonts
        HANDLE      hDownFontList;      // list of DL id's of downloaded soft fonts
        LPSTR       lpDownFontList;     // lock down 'hDownFontList'.
        short       sMaxDLSlots;        // max length of 'hDownFontList'
    } DLCTL, FAR * LPDLCTL;                                 // download control // always do a full page page first to see what is in the page define FULL_PAGE_BAND  0

//---------------------------------------------------------------------------//
// PQCTL is included in PDEVICE for controlling the state of the priority
// queue to implement textout
//---------------------------------------------------------------------------// typedef struct
{
    HANDLE  hHeap;              // memory handle to heap used by priority queue
    WORD    size;
    WORD    oHeap;
} HEAP, FAR * LPHEAP;

typedef struct
{
    short   iPage;
    WORD    fErrMode;
} PAGEERR, FAR * LPPAGEERR;

//---------------------------------------------------------------------------//
// DEVICE DATA STRUCTURE - Device context structure for printer drivers.
//---------------------------------------------------------------------------// typedef struct pdev
{
    short       iType;              // type of device.
    short       oBruteHdr;          // offset to get brute bitmap header
    HANDLE      hmd;                // reserved for minidriver
    LPSTR       lpmd;               // reserved for minidriver WORD        fMDGeneral;         // General printer capabilities from MODELDATA
    WORD        fPaperSrc;          // Paper source flags from mini-driver
    DWORD       fMode;              // Device context flags
    WORD        fErrMode;           // error flags
    WORD        fText;              // text capabilities
    WORD        fXMove;             // X move flags from CURSORMOVE
    WORD        fYMove;             // Y move flags from CURSORMOVE
    WORD        fRectFillGeneral;
                                    // general flags from RECTFILL
    WORD        fColorFormat;       // color flags DEVCOLOR:
                                    // either fFormat from ColorPlane, or:
                                    // ??? from ColorPixel (TBD).
    DWORD       dwPhysWhite;        // Physical white color
    DWORD       dwPhysBlack;        // Physical black color
    short       sMinXRight;         // min master units to move left
```

```
             short     sMinXLeft;         // min master units to move right
        //   short     sMinXMoveUnits;    // min master units to activate X move cmd
             WORD      wDevPlanes;        // # of planes in the device color model,
                                          // assuming fMode.PF_COLOR_PLANE is set.
 5           WORD      wMinGray;          // min gray level, if support area fill.
             WORD      wMaxGray;          // max gray level, if support area fill.
             short     sCopies;           // # of copies requested.
             short     sMaxCopies;        // # of copies allowed.
             short     sDuplex;
10           int       nFonts;            // total # of fonts available
             WORD      orgwStartDocCmdOrder;
                                          // a list of cmd id's specifying the order
             //short    iTransTab;         // Default translation table
             POINT     ptDefaultFont;     // default font width & height.
15           HANDLE    hFontMap;          // memory handle to TEXTMETRIC font table
             HANDLE    hFontFace;         // handle to list of unique font face names
             HANDLE    hResTabs;          // resource handle to tables.
             LPDH      lpdh;              // long pointer to the start of tables.
             HDC       hDC;               // handle to application DC
20           HANDLE    hUnidrv;           // module handle of the unidrv
             HANDLE    hMd;               // module handle of the Mini Driver
             ATOM      aPort;             // atomized port name
             ATOM      aDeviceName;       // atomized device name 25           PAPERFORMAT pfPaper;         // paper format structure
             BANDFORMAT  bf;              // band format
             BITMAP      bmHdr;           // GDI bitmap header
             BITMAPINFOHEADER dibInfo;    // DIB info hearder
             OUTPUTCTL   ctl;             // state of the printer
30           FONTCOUNT   fc;              // Count number of fonts used
             RECT        rcClipRgn;       // only draw to this clipping rectangle
             RECT        rcGraphics;      // graphics bounding rectangle
             RESOLUTION  Resolution;      // resolution Data where 'sTextYOffset'
                                          // has been scaled to the text units.
35
             FNBRUTE     fnBrute;         // structure of brute functions 40      struct    // FNCALLBACK  points to callback functions
        {
            short (FAR PASCAL *fnOEMDump)(struct pdev FAR *, LPPOINT, WORD);
            short (FAR PASCAL *fnOEMGrxFilter)(struct pdev FAR *, LPSTR, WORD);
            short (FAR PASCAL *fnOEMBlockOut)(struct pdev FAR *, short, short,
45              LPSTR, short, short);
        } fnCallback;

// The following fields are used only for output.
50      int       iModel;            // index into the MODELDATA array.
        short     sLookAhead;        // size of look-ahead region in text units
        WORD      oSpool;            // offset into the spool buffer
        OCD       rgocdCmd[MAXCMD + MAXECMD];
                                     // command table itself
55      HEAP      hpTextOut;         // TextOut descriptor storage
        HEAP      hpCmd;             // Font slection command storage
        HANDLE    hText;             // Temporary buffer for chPosition/download
                                     // bitmap
        DWORD     cbText;            // size of Text buffer
60      HANDLE    hYPQ;              // handle to priority queue sorted by Y
        HANDLE    hXPQ;              // handle to priority queue sorted by X
        HANDLE    hBitmap;           // memory handle to banding bitmap
        HANDLE    hBuf;              // memory handle to working buffer for dump()
        HANDLE    hTransBuf;         // memory handle to working buffer for dump()
65                                   // for laser format landscape
        HANDLE    hBlackBuf;         // memory handle to working black buffer for
                                     // color dump
        HANDLE    hCompressBuf;      // memory handle to working compression buffer
        HANDLE    hCompressBuf1;     // memory handle to working compression buffer
70      HANDLE    hCompressBuf2;     // memory handle to working compression buffer
        short     sDefCTTid;         // id of default CTT
        HANDLE    hDefaultCTT;       // handle to the default char transl. table
```

```
        short       sCTTid;              // resource id # of the current CTT.
        HANDLE      hCurrentCTT;         // handle to the current CTT
        short       iBestFont;           // index for best font
        DLCTL       dlctl;               // download controls.
5       char        chSpool[CCHSPOOL];
        } DEVICE, FAR * LPDV;

#define PD_MEMORY        0       // iType - memory device

10      #define COLORPLANES 3
        #define BLACKPLANE  1

// hRcHeap - resource heap area contains command descriptors from the heap in
15      // from the resource file of the mini driver
        // pq.hPQHeap is a character heap used to spool text out strings // flags for fMode
        // --- lower word:
20      #define  PF_INFOCONTEXT    0x00000001 // this PDEVICE is only for INFO Context
        #define  PF_DRAFT          0x00000002 // this PDEVICE is only for draft mode output
        #define  PF_ANYTEXT_BAND   0x00000004 // Any text in the current band
        #define  PF_ANYGRX_BAND    0x00000008 // Any graphics in the current band 25      #define  PF_ANYGRX_PAGE    0x00000010 // Any graphics in the page (for optimization)
        #define  PF_ENUM_GRAPHICS  0x00000020 // enumerate graphics in this band
        #define  PF_ENUM_TEXT      0x00000040 // enumerate text in this band
        #define  PF_SEPARATE_TEXT  0x00000080 // require seperate text band (whole page)

30      #define  PF_LANDSCAPE      0x00000100 // Landscape mode, default: portrait
        #define  PF_DLTT           0x00000200 // download truetype fonts
        #define  PF_BMPTT          0x00000400 // Put TrueType in bitmap as device fonts define  PF_MULTIPLEBANDS  0x00000800 // Force multiple bands.
35
        #define  PF_BKSP_OK        0x00001000 // OK to use backspace to overlay characters
        #define  PF_RECT_FILL      0x00002000 // can do rectangle area fill
        #define  PF_SUPPORT_TIFF   0x00004000 // can do TIFF compression
        #define  PF_DIB_BRUTE      0x00008000 // Use DIB as internal format
40
        // fMode --- high word:
        #define  PF_NO_X_MOVE_CMD  0x00010000 // printer has no X movement cmd
        #define  PF_NO_Y_MOVE_CMD  0x00020000 // printer has no Y movement cmd
        #define  PF_RESETDC        0x00040000 // a reset lpdv
45      #define  PF_RESETPAGE      0x00080000 // reset fonts every page define  PF_PCL4                0x00100000 // PCL 4 device...more hacks for 3.0 comp
        #define  PF_SUPPORT_DELTAROW    0x00200000 // can do Delta Row compression
        #define  PF_MONODITHER          0x00400000 // set if dwPhysBlack & dwPhysWhite are
50
        #define  PF_ENUM_WHITE_TEXT     0x00800000 // process white text in this band
        #define  PF_ANY_WHITE_TEXT      0x01000000 // flag if there is any white text
                                                   // on the page.
        #define  PF_JOB_SEPARATION      0x02000000 // flag if send job sep cmd at end
55      #define  PF_DLFONT_RES_SPEC     0x04000000 // support resolution specified
                                                   // bitmap font downloading.
        #define  PF_Y_CAP_INIT          0x08000000 // flag if having sent a y=0 absolute
                                                   // move command on the current page.
                                                   // Used for properly initializing CAP
60      #define  PF_PCLETTO             0x10000000    // download TrueType outlines //
        // flags for fErrMode
        //
65      #define  ERR_OUT_OF_MEM     0x0001   // out of printer memory
        #define  ERR_OVER_FONT_USE  0x0002   // exceed max # of fonts used on a page
        #define  ERR_NO_TRACKING    0x0004   // no tracking - low memory
        #define  ERR_OVER_JOB_LIMIT 0x0008   // exceed max # of font in a job 70      // Following 3 bits are exclusive
        #define  ERR_DUP            0x1000   // duplex failure
        #define  ERR_BMPTT          0x2000   // 2nd attempt at replaying the page
```

77

```
#define ERR_RECOVERABLE    0x8000      // recoverable error
//
// flags for XMOVETO
//
#define XM_FINE         0x01
#define XM_UPDATE       0x02      // update current x position only
#define XM_RELATIVE     0x04      // to be applied in conjunction with XM_UPDATE
                                  // relative update v.s. absolute
#define XM_GRAPHICS     0x08      // parameter x is in graphics unit, v.s. default
                                  // is in master units
#define XM_PHYSICAL     0x10      // the movement is given relative to the
                                  // physical 0 position.

// #define XM_CR        0x04      // send a carraige return, but restore
                                  // the current x position back // flags for YMOVETO define YM_UPDATE       0x02      // update current y position only
define YM_RELATIVE     0x04      // to be applied in conjunction with YM_UPDATE
                                  // relative update y position
#define YM_GRAPHICS     0x08      // parameter y is in graphics units, v.s.
                                  // default is in text units.
#define YM_PHYSICAL     0x10      // the movement is relative to the
                                  // physical 0 position.

typedef struct
{
    short   param;
    short   max;
    short   rem;
} DEVICECMD, FAR *LPDEVICECMD;

/* For DRAWPATTERNRECT
*/
typedef struct {
    POINT ptPosition;
    POINT ptSize;
    WORD  wStyle;
    WORD  wPattern;
} DRAWPATRECT;
typedef DRAWPATRECT FAR * LPDRAWPATRECT;
```

Table 2

```
// keep parentheses around constants to avoid potential errors in expansions.
//****************
// basic commands:
//****************
// --- from RESOLUTION:
#define CMD_RES_FIRST          0                                            // 0
#define CMD_RES_SELECTRES      (CMD_RES_FIRST + RES_OCD_SELECTRES)
#define CMD_RES_BEGINGRAPHICS  (CMD_RES_FIRST + RES_OCD_BEGINGRAPHICS)
#define CMD_RES_ENDGRAPHICS    (CMD_RES_FIRST + RES_OCD_ENDGRAPHICS)
#define CMD_RES_SENDBLOCK      (CMD_RES_FIRST + RES_OCD_SENDBLOCK)
#define CMD_RES_ENDBLOCK       (CMD_RES_FIRST + RES_OCD_ENDBLOCK)
#define CMD_RES_LAST           (CMD_RES_FIRST + RES_OCD_MAX - 1)            // 4

// --- from COMPRESSMODE
#define CMD_CMP_FIRST          (CMD_RES_LAST + 1)                           // 5
#define MAX_COMP_CMDS          4
#define CMD_CMP_NONE           (CMD_CMP_FIRST + 0)
#define CMD_CMP_RLE            (CMD_CMP_FIRST + 1)
#define CMD_CMP_TIFF           (CMD_CMP_FIRST + 2)
#define CMD_CMP_DELTAROW       (CMD_CMP_FIRST + 3)
```

78

```
        #define CMD_CMP_LAST         (CMD_CMP_FIRST + MAX_COMP_CMDS - 1)    // 8

// --- from PAGECONTROL structure
        #define CMD_PC_FIRST         (CMD_CMP_LAST + 1)
   5    #define CMD_PC_BEGIN_DOC     (CMD_PC_FIRST + PC_OCD_BEGIN_DOC)       // 9
        #define CMD_PC_BEGIN_PAGE    (CMD_PC_FIRST + PC_OCD_BEGIN_PAGE)
        #define CMD_PC_DUPLEX_ON     (CMD_PC_FIRST + PC_OCD_DUPLEX_ON)
        #define CMD_PC_ENDDOC        (CMD_PC_FIRST + PC_OCD_ENDDOC)
        #define CMD_PC_ENDPAGE       (CMD_PC_FIRST + PC_OCD_ENDPAGE)
  10    #define CMD_PC_DUPLEX_OFF    (CMD_PC_FIRST + PC_OCD_DUPLEX_OFF)
        #define CMD_PC_ABORT         (CMD_PC_FIRST + PC_OCD_ABORT)
        #define CMD_PC_PORTRAIT      (CMD_PC_FIRST + PC_OCD_PORTRAIT)
        #define CMD_PC_ORIENTATION   (CMD_PC_PORTRAIT)
        #define CMD_PC_LANDSCAPE     (CMD_PC_FIRST + PC_OCD_LANDSCAPE)
  15    #define CMD_PC_MULT_COPIES   (CMD_PC_FIRST + PC_OCD_MULT_COPIES)
        #define CMD_PC_DUPLEX_VERT   (CMD_PC_FIRST + PC_OCD_DUPLEX_VERT)
        #define CMD_PC_DUPLEX_HORZ   (CMD_PC_FIRST + PC_OCD_DUPLEX_HORZ)
        #define CMD_PC_PRINT_DIR     (CMD_PC_FIRST + PC_OCD_PRN_DIRECTION)
        #define CMD_PC_JOB_SEPARATION (CMD_PC_FIRST + PC_OCD_JOB_SEPARATION)
  20    #define CMD_PC_LAST          (CMD_PC_FIRST + PC_OCD_MAX - 1)          // 22

// --- from CURSORMOVE
        #define CMD_CM_FIRST         (CMD_PC_LAST + 1)
  25    #define CMD_CM_XM_ABS        (CMD_CM_FIRST + CM_OCD_XM_ABS)           // 23
        #define CMD_CM_XM_REL        (CMD_CM_FIRST + CM_OCD_XM_REL)
        #define CMD_CM_XM_RELLEFT    (CMD_CM_FIRST + CM_OCD_XM_RELLEFT)
        #define CMD_CM_YM_ABS        (CMD_CM_FIRST + CM_OCD_YM_ABS)
        #define CMD_CM_YM_REL        (CMD_CM_FIRST + CM_OCD_YM_REL)
  30    #define CMD_CM_YM_RELUP      (CMD_CM_FIRST + CM_OCD_YM_RELUP)
        #define CMD_CM_YM_LINESPACING (CMD_CM_FIRST + CM_OCD_YM_LINESPACING)
        #define CMD_CM_XY_REL        (CMD_CM_FIRST + CM_OCD_XY_REL)
        #define CMD_CM_XY_ABS        (CMD_CM_FIRST + CM_OCD_XY_ABS)
        #define CMD_CM_CR            (CMD_CM_FIRST + CM_OCD_CR)
  35    #define CMD_CM_LF            (CMD_CM_FIRST + CM_OCD_LF)
        #define CMD_CM_FF            (CMD_CM_FIRST + CM_OCD_FF)
        #define CMD_CM_BS            (CMD_CM_FIRST + CM_OCD_BS)
        #define CMD_CM_UNI_DIR       (CMD_CM_FIRST + CM_OCD_UNI_DIR)
        #define CMD_CM_UNI_DIR_OFF   (CMD_CM_FIRST + CM_OCD_UNI_DIR_OFF)
  40    #define CMD_CM_PUSH_POS      (CMD_CM_FIRST + CM_OCD_PUSH_POS)
        #define CMD_CM_POP_POS       (CMD_CM_FIRST + CM_OCD_POP_POS)
        #define CMD_CM_LAST          (CMD_CM_FIRST + CM_OCD_MAX - 1)          // 39

// --- from FONTSIMULATION
  45    #define CMD_FS_FIRST         (CMD_CM_LAST + 1)
        #define CMD_FS_BOLD_ON       (CMD_FS_FIRST + FS_OCD_BOLD_ON)          // 40
        #define CMD_FS_BOLD_OFF      (CMD_FS_FIRST + FS_OCD_BOLD_OFF)
        #define CMD_FS_ITALIC_ON     (CMD_FS_FIRST + FS_OCD_ITALIC_ON)
        #define CMD_FS_ITALIC_OFF    (CMD_FS_FIRST + FS_OCD_ITALIC_OFF)
  50    #define CMD_FS_UNDERLINE_ON  (CMD_FS_FIRST + FS_OCD_UNDERLINE_ON)
        #define CMD_FS_UNDERLINE_OFF (CMD_FS_FIRST + FS_OCD_UNDERLINE_OFF)
        #define CMD_FS_DOUBLEUNDERLINE_ON  (CMD_FS_FIRST + FS_OCD_DOUBLEUNDERLINE_ON)
        #define CMD_FS_DOUBLEUNDERLINE_OFF (CMD_FS_FIRST + FS_OCD_DOUBLEUNDERLINE_OFF)
        #define CMD_FS_STRIKETHRU_ON (CMD_FS_FIRST + FS_OCD_STRIKETHRU_ON)
  55    #define CMD_FS_STRIKETHRU_OFF (CMD_FS_FIRST + FS_OCD_STRIKETHRU_OFF)
        #define CMD_FS_WHITE_TEXT_ON (CMD_FS_FIRST + FS_OCD_WHITE_TEXT_ON)
        #define CMD_FS_WHITE_TEXT_OFF (CMD_FS_FIRST + FS_OCD_WHITE_TEXT_OFF)
        // not used so far
        #define CMD_FS_PROPSPACE_ON  (CMD_FS_FIRST + FS_OCD_PROPSPACE_ON)
  60    #define CMD_FS_PROPSPACE_OFF (CMD_FS_FIRST + FS_OCD_PROPSPACE_OFF)
        #define CMD_FS_SETPITCH      (CMD_FS_FIRST + FS_OCD_SETPITCH)
        #define CMD_FS_RESETPITCH    (CMD_FS_FIRST + FS_OCD_RESETPITCH)

#define CMD_FS_LAST          (CMD_FS_FIRST + FS_OCD_MAX - 1)          // 55
  65
        // from DEVCOLOR
        #define MAX_COLOR_PLANES     4
        #define CMD_DC_FIRST         (CMD_FS_LAST + 1)                        // 56
        // #define CMD_DC_TC_BASECMD  CMD_DC_FIRST
  70    // #define CMD_DC_TC_FIRST    (CMD_DC_TC_BASECMD + 1)
        #define CMD_DC_TC_FIRST      (CMD_DC_FIRST + 1)                       // 57
        #define CMD_DC_TC_BLACK      (CMD_DC_TC_FIRST + DC_TC_BLACK)
```

```
        #define CMD_CMP_LAST            (CMD_CMP_FIRST + MAX_COMP_CMDS - 1)          // 8

// --- from PAGECONTROL structure
        #define CMD_PC_FIRST            (CMD_CMP_LAST + 1)                           // 9
        #define CMD_PC_BEGIN_DOC        (CMD_PC_FIRST + PC_OCD_BEGIN_DOC)
        #define CMD_PC_BEGIN_PAGE       (CMD_PC_FIRST + PC_OCD_BEGIN_PAGE)
        #define CMD_PC_DUPLEX_ON        (CMD_PC_FIRST + PC_OCD_DUPLEX_ON)
        #define CMD_PC_ENDDOC           (CMD_PC_FIRST + PC_OCD_ENDDOC)
        #define CMD_PC_ENDPAGE          (CMD_PC_FIRST + PC_OCD_ENDPAGE)
        #define CMD_PC_DUPLEX_OFF       (CMD_PC_FIRST + PC_OCD_DUPLEX_OFF)
        #define CMD_PC_ABORT            (CMD_PC_FIRST + PC_OCD_ABORT)
        #define CMD_PC_PORTRAIT         (CMD_PC_FIRST + PC_OCD_PORTRAIT)
        #define CMD_PC_ORIENTATION      (CMD_PC_PORTRAIT)
        #define CMD_PC_LANDSCAPE        (CMD_PC_FIRST + PC_OCD_LANDSCAPE)
        #define CMD_PC_MULT_COPIES      (CMD_PC_FIRST + PC_OCD_MULT_COPIES)
        #define CMD_PC_DUPLEX_VERT      (CMD_PC_FIRST + PC_OCD_DUPLEX_VERT)
        #define CMD_PC_DUPLEX_HORZ      (CMD_PC_FIRST + PC_OCD_DUPLEX_HORZ)
        #define CMD_PC_PRINT_DIR        (CMD_PC_FIRST + PC_OCD_PRN_DIRECTION)
        #define CMD_PC_JOB_SEPARATION   (CMD_PC_FIRST + PC_OCD_JOB_SEPARATION)
        #define CMD_PC_LAST             (CMD_PC_FIRST + PC_OCD_MAX - 1)              // 22

// --- from CURSORMOVE
        #define CMD_CM_FIRST            (CMD_PC_LAST + 1)                            // 23
        #define CMD_CM_XM_ABS           (CMD_CM_FIRST + CM_OCD_XM_ABS)
        #define CMD_CM_XM_REL           (CMD_CM_FIRST + CM_OCD_XM_REL)
        #define CMD_CM_XM_RELLEFT       (CMD_CM_FIRST + CM_OCD_XM_RELLEFT)
        #define CMD_CM_YM_ABS           (CMD_CM_FIRST + CM_OCD_YM_ABS)
        #define CMD_CM_YM_REL           (CMD_CM_FIRST + CM_OCD_YM_REL)
        #define CMD_CM_YM_RELUP         (CMD_CM_FIRST + CM_OCD_YM_RELUP)
        #define CMD_CM_YM_LINESPACING   (CMD_CM_FIRST + CM_OCD_YM_LINESPACING)
        #define CMD_CM_XY_REL           (CMD_CM_FIRST + CM_OCD_XY_REL)
        #define CMD_CM_XY_ABS           (CMD_CM_FIRST + CM_OCD_XY_ABS)
        #define CMD_CM_CR               (CMD_CM_FIRST + CM_OCD_CR)
        #define CMD_CM_LF               (CMD_CM_FIRST + CM_OCD_LF)
        #define CMD_CM_FF               (CMD_CM_FIRST + CM_OCD_FF)
        #define CMD_CM_BS               (CMD_CM_FIRST + CM_OCD_BS)
        #define CMD_CM_UNI_DIR          (CMD_CM_FIRST + CM_OCD_UNI_DIR)
        #define CMD_CM_UNI_DIR_OFF      (CMD_CM_FIRST + CM_OCD_UNI_DIR_OFF)
        #define CMD_CM_PUSH_POS         (CMD_CM_FIRST + CM_OCD_PUSH_POS)
        #define CMD_CM_POP_POS          (CMD_CM_FIRST + CM_OCD_POP_POS)
        #define CMD_CM_LAST             (CMD_CM_FIRST + CM_OCD_MAX - 1)              // 39

// --- from FONTSIMULATION
        #define CMD_FS_FIRST            (CMD_CM_LAST + 1)                            // 40
        #define CMD_FS_BOLD_ON          (CMD_FS_FIRST + FS_OCD_BOLD_ON)
        #define CMD_FS_BOLD_OFF         (CMD_FS_FIRST + FS_OCD_BOLD_OFF)
        #define CMD_FS_ITALIC_ON        (CMD_FS_FIRST + FS_OCD_ITALIC_ON)
        #define CMD_FS_ITALIC_OFF       (CMD_FS_FIRST + FS_OCD_ITALIC_OFF)
        #define CMD_FS_UNDERLINE_ON     (CMD_FS_FIRST + FS_OCD_UNDERLINE_ON)
        #define CMD_FS_UNDERLINE_OFF    (CMD_FS_FIRST + FS_OCD_UNDERLINE_OFF)
        #define CMD_FS_DOUBLEUNDERLINE_ON  (CMD_FS_FIRST + FS_OCD_DOUBLEUNDERLINE_ON)
        #define CMD_FS_DOUBLEUNDERLINE_OFF (CMD_FS_FIRST + FS_OCD_DOUBLEUNDERLINE_OFF)
        #define CMD_FS_STRIKETHRU_ON    (CMD_FS_FIRST + FS_OCD_STRIKETHRU_ON)
        #define CMD_FS_STRIKETHRU_OFF   (CMD_FS_FIRST + FS_OCD_STRIKETHRU_OFF)
        #define CMD_FS_WHITE_TEXT_ON    (CMD_FS_FIRST + FS_OCD_WHITE_TEXT_ON)
        #define CMD_FS_WHITE_TEXT_OFF   (CMD_FS_FIRST + FS_OCD_WHITE_TEXT_OFF)
        // not used so far
        #define CMD_FS_PROPSPACE_ON     (CMD_FS_FIRST + FS_OCD_PROPSPACE_ON)
        #define CMD_FS_PROPSPACE_OFF    (CMD_FS_FIRST + FS_OCD_PROPSPACE_OFF)
        #define CMD_FS_SETPITCH         (CMD_FS_FIRST + FS_OCD_SETPITCH)
        #define CMD_FS_RESETPITCH       (CMD_FS_FIRST + FS_OCD_RESETPITCH)

#define CMD_FS_LAST             (CMD_FS_FIRST + FS_OCD_MAX - 1)              // 55

// from DEVCOLOR
        #define MAX_COLOR_PLANES        4
        #define CMD_DC_FIRST            (CMD_FS_LAST + 1)                            // 56
        // #define CMD_DC_TC_BASECMD       CMD_DC_FIRST
        // #define CMD_DC_TC_FIRST         (CMD_DC_TC_BASECMD + 1)
        #define CMD_DC_TC_FIRST         (CMD_DC_FIRST + 1)                           // 57
        #define CMD_DC_TC_BLACK         (CMD_DC_TC_FIRST + DC_TC_BLACK)
```

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A computer system for outputting data to an output device, comprising:

an application program for invoking a plurality of predefined graphics device interface functions to control the sending of data to the output device;

a graphics device interface having an implementation of the plurality of the graphics device interface functions, wherein the implementation invokes a plurality of device driver functions for controlling the outputting of the data;

a plurality of minidrivers, each minidriver having an implementation of the plurality of device driver functions that are invoked by the graphics device interface functions for an output device, wherein each device driver function invokes an analogous device driver function, each minidriver having device-specific information describing attributes of an output device, and having means for invoking an initialization function passing the device-specific information; and a universal driver having an implementation of the initialization function that is invoked by each minidriver wherein the initialization function processes and stores the device-specific information passed to the initialization function by the invoking minidriver, the universal driver having an implementation of each analogous device driver function that is invoked by each minidriver wherein the analogous device driver functions control the outputting of data to each output device in accordance with the stored device-specific information for that output device.

2. The computer system of claim 1 wherein the minidriver includes a call-back routine for performing a device-specific behavior, wherein the means for invoking the initialization routine passes an indication of the call-back routine, and wherein the implementation of the analogous device driver functions invokes the call-back routine to perform the device-specific behavior.

3. A computer system for outputting data to one of a plurality of output devices, comprising:

a program for selecting an output device and for invoking a plurality of device driver functions to control the outputting of data to the selected output device;

a minidriver for each of the plurality of output devices, each minidriver having an implementation of the plurality of device driver functions that are invoked by the program wherein each device driver function invokes an analogous device driver function, having device-specific information describing attributes of the output device, and having means for invoking an initialization function passing the device-specific information; and a universal driver having an implementation of the initialization function that is invoked by each minidriver wherein the initialization function processes and stores the passed device-specific information, the universal driver having an implementation of each analogous device driver function that is invoked by each minidriver to control the outputting of data to each output device in accordance with the stored device-specific information for that output device.

4. The computer system of claim 3 wherein the minidriver includes a call-back routine for performing a device-specific behavior and wherein the means for invoking the initialization routine passes an indication of the call-back routine, and wherein the implementation of the analogous device-specific functions invokes the call-back routine to perform the device-specific behavior.

5. A method in a computer system for outputting data to a plurality of output devices, the computer system having a program, a minidriver associated with each output device, and a universal driver, each minidriver having a plurality of minidriver functions for controlling the outputting of the data to the output device by invoking functions of the universal driver, the method comprising the steps of:

during execution of the program, selecting an output device and invoking the minidriver functions of the minidriver associated with the selected output device;

during execution of the invoked minidriver functions, invoking functions of the universal driver passing an indication of the selected output device and invoking an initialization function of the universal driver passing an indication of and attributes of the selected output device, each function of the universal driver having a behavior;

during execution of the initialization function, processing the passed attributes and storing the indication and the processed attributes; and during execution of each function of the universal driver, accessing the stored attributes and performing the behavior of the function.

6. A method of implementing device drivers for interfacing between application programs and devices in a computer system, the method comprising the steps of:

developing a universal driver having a plurality of universal driver functions having a behavior to effect the output of data to a device, the behavior of each universal driver function being adaptable to each output device based of device-specific attributes;

developing a minidriver for each device, the minidriver have device-specific attributes and comprising a plurality of interfacing functions having a behavior to effect the output of data to a device, the interfacing functions including means for invoking the universal driver functions to effect the behavior of the interfacing functions; and developing an application program that invokes the interfacing functions to output data to the devices.

7. The method of claim 5 wherein, during execution of the invoked minidriver functions, passing an indication of and attributes of the selected output device further includes the steps of:

storing header information having an array of references to arrays of printer characteristics, the printer characteristics including printer model characteristics and printer attribute characteristics;

storing an array of printer model characteristics, each printer model characteristic comprising printer model-specific data including references to printer attributes;

for each printer attribute, storing attribute-specific data; and passing a reference to the stored header information.

8. The method of claim 7 wherein the printer attributes include resolution data, paper size data, paper quality data, paper source data, paper destination data, text quality data, compression data, font cartridge data, and color data, page control data, cursor movement data, font simulation data, rectangle fill data, or download data.

9. The method of claim 8 wherein, during execution of the initialization function, the processing of passed attributes and the storing of the indication and the processed attributes further includes the steps of:

designating a printer model;

retrieving header information;

retrieving a printer model characteristic for the designated printer; and for each printer attribute referenced by the retrieved printer mode characteristic, retrieving the printer attribute.

10. A computer-readable storage medium containing instructions for controlling a computer system to perform a method for outputting data to a plurality of output devices, the computer system having a program, a minidriver associated with each output device, and a universal driver, each minidriver having a plurality of minidriver functions for controlling the outputting of the data to the output device by invoking functions of the universal driver, the method comprising the steps of:

during execution of the program, selecting an output device and invoking the minidriver functions of the minidriver associated with the selected output device;

invoking functions of the universal driver passing an indication of the selected output device and invoking an initialization function of the universal driver passing an indication of and attributes of the selected output device, each function of the universal driver having a behavior;

processing the passed attributes and storing the indication and the processed attributes; and accessing the stored attributes and performing the behavior of the function.

11. The computer-readable medium of claim 10, wherein the step of invoking functions of the universal driver is executed during execution of the invoked minidriver functions.

12. The computer-readable medium of claim 10, wherein the step of processing the passed attributes is executed during execution of the initialization function.

13. The computer-readable medium of claim 10, wherein the step of accessing the stored attributes is executed during execution of each function of the universal driver.

\* \* \* \* \*